(12) United States Patent
Miyakawa

(10) Patent No.: US 7,901,787 B2
(45) Date of Patent: Mar. 8, 2011

(54) RESIN COMPOSITE-TYPE OPTICAL ELEMENT AND PROCESS FOR PRODUCING THE RESIN COMPOSITE-TYPE OPTICAL ELEMENT

(75) Inventor: Akiko Miyakawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/659,730

(22) Filed: Mar. 18, 2010

(65) Prior Publication Data

US 2010/0238540 A1 Sep. 23, 2010

Related U.S. Application Data

(63) Continuation of application No. PCT/JP2008/066868, filed on Sep. 18, 2008.

(30) Foreign Application Priority Data

Sep. 19, 2007 (JP) ................................ P2007-242020

(51) Int. Cl.
*B32B 27/08* (2006.01)
*B32B 27/16* (2006.01)
*B32B 27/18* (2006.01)
*B32B 27/26* (2006.01)
*B32B 27/30* (2006.01)

(52) U.S. Cl. ......... 428/522; 428/500; 359/350; 359/355; 359/359; 359/361; 359/566; 522/6; 522/7; 522/182

(58) Field of Classification Search .................... None
See application file for complete search history.

(56) References Cited

U.S. PATENT DOCUMENTS

| 4,482,204 | A  | * | 11/1984 | Blyler et al. ............... 385/141 |
| 5,629,365 | A  | * | 5/1997 | Razavi ...................... 524/37 |
| 5,806,834 | A  | * | 9/1998 | Yoshida ..................... 252/589 |
| 5,952,096 | A  | * | 9/1999 | Yamashita et al. ............ 428/332 |
| 6,174,155 | B1 | * | 1/2001 | Buazza et al. ............... 425/143 |
| 6,777,070 | B1 | * | 8/2004 | Murata et al. ............... 428/323 |
| 6,974,850 | B2 | * | 12/2005 | McMan et al. ............... 524/556 |
| 7,070,862 | B1 | * | 7/2006 | Miyakawa et al. ......... 428/425.6 |
| 7,125,591 | B2 | * | 10/2006 | Nakajima et al. ............ 428/1.33 |
| 7,153,588 | B2 | * | 12/2006 | McMan et al. ............... 428/483 |

(Continued)

FOREIGN PATENT DOCUMENTS

JP 2-213801 8/1990

(Continued)

OTHER PUBLICATIONS

International Search Report for PCT/JP2008/066868, mailed Dec. 22, 2008.

(Continued)

*Primary Examiner* — Vivian Chen

(57) ABSTRACT

An object of the present invention is to provide a resin composite-type optical element capable of cutting off ultraviolet light even though it uses a photocurable resin. A resin composite-type optical element of the embodiment of the present invention is a resin composite-type optical element having a base material and a resin layer, and the resin layer has at least a first resin layer which is a molded product of a photocurable resin and which has an internal transmittance of not less than 85% for light of the wavelength of 400 nm in the thickness of 100 μm and an internal transmittance of not more than 3% for light of the wavelength of 360 nm in the thickness of 100 μm.

10 Claims, 7 Drawing Sheets

U.S. PATENT DOCUMENTS

| | | | |
|---|---|---|---|
| 7,297,810 B2 * | 11/2007 | Walker et al. | 560/221 |
| 7,326,423 B2 * | 2/2008 | Pearson et al. | 424/427 |
| 7,390,864 B2 * | 6/2008 | Nozoe et al. | 526/281 |
| 7,550,182 B2 * | 6/2009 | Inagaki et al. | 428/1.33 |
| 2008/0094712 A1 * | 4/2008 | Miyakawa | 359/566 |
| 2008/0107903 A1 * | 5/2008 | Miyakawa et al. | 428/409 |

FOREIGN PATENT DOCUMENTS

| | | | |
|---|---|---|---|
| JP | 04-292661 | * | 10/1992 |
| JP | 7-110403 | | 4/1995 |
| JP | 2000-266907 | | 9/2000 |
| JP | 2001-235601 | | 8/2001 |
| JP | 2001-514313 | | 9/2001 |
| JP | 2001-305305 | | 10/2001 |
| JP | 2001-519916 | | 10/2001 |
| JP | 2002-82209 | | 3/2002 |
| JP | 2003-211606 | * | 7/2003 |
| JP | 2006/068137 | | 6/2006 |
| WO | 97/42530 | | 11/1997 |
| WO | 99/11682 | | 3/1999 |

OTHER PUBLICATIONS

English Translation of the International Preliminary Report on Patentability (IPRP-Chapter 1) issued on Apr. 15, 2010 (Form PCT/IB/338).

* cited by examiner (A)

(B)

(C)

(A)

(B)

(C)

(D)

LIGHT (E)

RESIN COMPOSITE-TYPE OPTICAL ELEMENT AND PROCESS FOR PRODUCING THE RESIN COMPOSITE-TYPE OPTICAL ELEMENT

CROSS-REFERENCE TO RELATED APPLICATIONS

This application is a continuation application of PCT/JP2008/066868 filed Sep. 18, 2008 claiming the benefit of priority of the Japanese Patent Application No. 2007-242020 filed on Sep. 19, 2007, the entire contents of which are incorporated herein by reference.

BACKGROUND

1. Field

An embodiment of the present invention relates to a resin composite-type optical element and, more particularly, to a resin composite-type optical element to cut off the ultraviolet light and a process for producing the resin composite-type optical element.

2. Description of the Related Art

An optical element capable of cutting off the ultraviolet light is very valuable in various uses. For example, when the optical element capable of cutting off the ultraviolet light is used in binoculars and spectacles, it can prevent the harmful ultraviolet light from entering eyes. When the optical element capable of cutting off the ultraviolet light is located on the object side of a member with low ultraviolet light resistance (a lens, a CCD, or the like), it can prevent deterioration of the member with low ultraviolet light resistance. In an optical system of an ordinary camera, an ultraviolet cut filter is interposed in front of a CCD.

Incidentally, a resin composite-type optical element like a composite-type aspherical lens is an optical element in which a resin layer is cemented to a surface of a base material such as glass. Since creation of shape is easier with resin than with glass, the resin composite-type allows the optical element to be produced in a complicated shape. When a photocurable resin is used for the resin layer, as compared with a case of use of a thermoset resin, no heat source is needed and a curing time is also shorter; therefore, it can greatly contribute to reduction in facilities and cost. In general, such an optical element is produced by applying light to a resin precursor put between a base material and a mold, from the base material side to cure it (cf. Japanese Patent Application Laid-open No. 2-213801).

SUMMARY

However, the resin composite-type optical element capable of cutting off the ultraviolet light cannot be produced by simply applying the foregoing conventional production process. With the photocurable resin, normally, a polymerization initiator in the resin precursor is excited by the ultraviolet light to initiate polymerization. For this reason, the resin precursor is unlikely to cure unless it is highly transparent to the ultraviolet light. As a result, the optical element produced becomes considerably transparent to the ultraviolet light.

An object of the present invention is to provide a resin composite-type optical element capable of cutting off the ultraviolet light even though it uses a photocurable resin.

In order to solve the problem, a first aspect of the embodiment of the present invention is a resin composite-type optical element comprising a base material and a resin layer, wherein the resin layer comprises at least a first resin layer which is a molded product of a photocurable resin and which has an internal transmittance of not less than 85% for light of the wavelength of 400 nm in the thickness of 100 μm and an internal transmittance of not more than 3% for light of the wavelength of 360 nm in the thickness of 100 μm.

The resin composite-type optical element of the present embodiment is preferably configured as follows: it has a coat layer on a surface of the base material opposite to the resin layer, and the surface on the coat layer side has a reflectance of not more than 1% for light of wavelengths from 400 nm to 700 nm and not less than 2% for the light of the wavelength of 360 nm.

The resin composite-type optical element is preferably configured as follows: the resin layer comprises a plurality of resin layers, which satisfy at least one of the following conditions: a) the layers are formed on one surface of the base material; and b) the layers are formed on both surfaces of the base material, and at least one of the plurality of resin layers is the first resin layer.

At least one layer of the first resin layer is preferably a cured product of a precursor composition containing: a bifunctional fluorinated (meth)acrylate; a bifunctional (meth)acrylate with a fluorene structure; a photopolymerization initiator; and a benzotriazole type ultraviolet absorber, or an ultraviolet absorber having a molar absorption coefficient of not less than 500 at the wavelength of 380 nm.

The resin composite-type optical element of the present embodiment preferably has a transmittance of not more than 50% for the light of the wavelength of 360 nm.

The resin composite-type optical element is preferably an aspherical optical element or a diffractive optical element.

A second aspect of the embodiment of the present invention is a process for producing a resin composite-type optical element comprising a base material and a resin layer, the process comprising: forming as the resin layer at least a first resin layer which is a molded product of a photocurable resin and which has an internal transmittance of not less than 85% for light of the wavelength of 400 nm in the thickness of 100 μm and an internal transmittance of not more than 3% for light of the wavelength of 360 nm in the thickness of 100 μm; and applying light of a wavelength of not less than 400 nm to a precursor composition of the first resin layer to cure the precursor composition, thereby forming the first resin layer.

In the production process of the resin composite-type optical element according to the present embodiment, preferably, the precursor composition contains a photopolymerization initiator having a molar absorption coefficient of not less than 5 for light of the wavelength of 405 nm.

The process preferably comprises forming at least one layer of the first resin layer, using a precursor composition containing: a bifunctional fluorinated (meth)acrylate; a bifunctional (meth)acrylate with a fluorene structure; a photopolymerization initiator; and a benzotriazole type ultraviolet absorber, or an ultraviolet absorber having a molar absorption coefficient of not less than 500 at the wavelength of 380 nm.

Furthermore, the precursor composition is preferably one having the internal transmittance of not more than 1% for the light of the wavelength of 360 nm in the thickness of 10 mm.

The resin composite-type optical elements according to the above embodiments make it feasible to provide the resin composite-type optical element capable of cutting off the ultraviolet light even if it uses the photocurable resin.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DESCRIPTION

Resin composite-type optical elements and processes for producing the resin composite-type optical elements according to a preferred embodiment of the present invention will be described below. The resin composite-type optical elements are also called resin cemented type optical elements. A composite-type aspherical lens which is one of modes of the resin composite-type optical elements is also called a PAG (Plastics on Aspherical Glass) lens.

Figure 1:
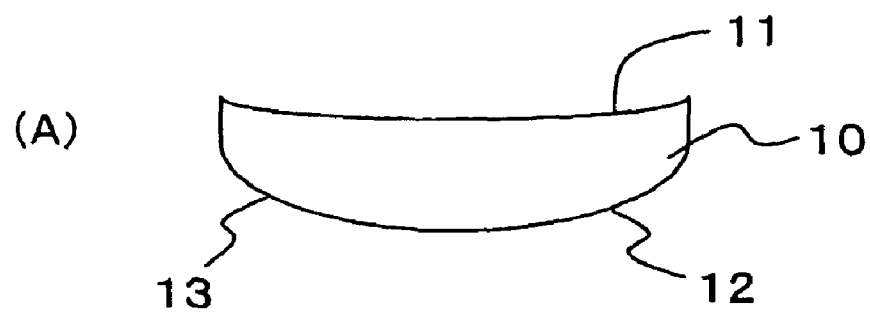
FIG. 1(A)-1(C) is a drawing showing production steps of a resin composite-type optical element (aspherical optical element) having a resin layer on one side of a base material.
Figure 1:
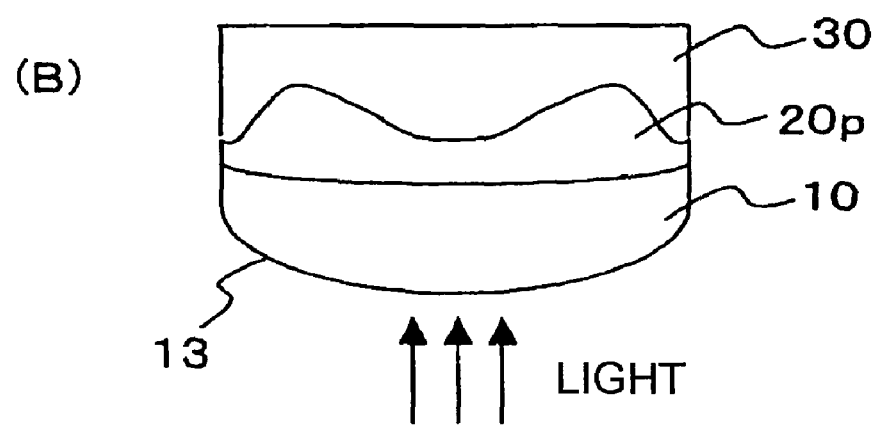
Figure 1:
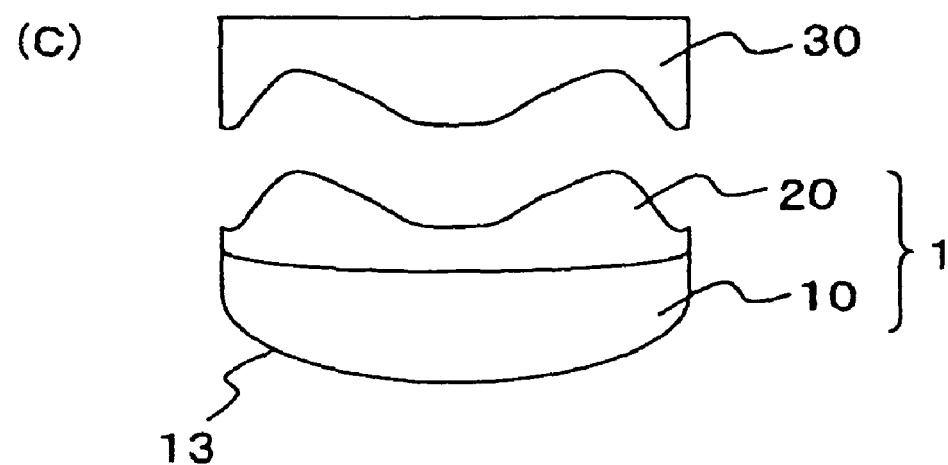
Figure 2:
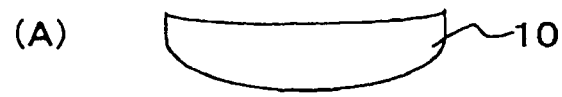
FIG. 2(A)-2(E) is a drawing showing production steps of a resin composite-type optical element (aspherical optical element) having a resin layer on each of the two sides of a base material.
Figure 2:
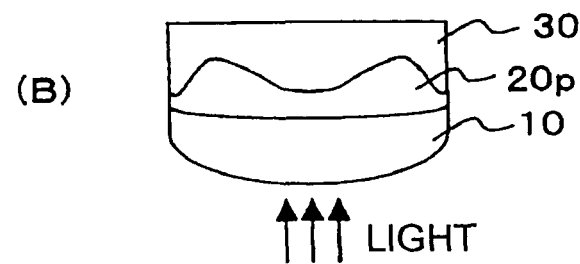
Figure 2:
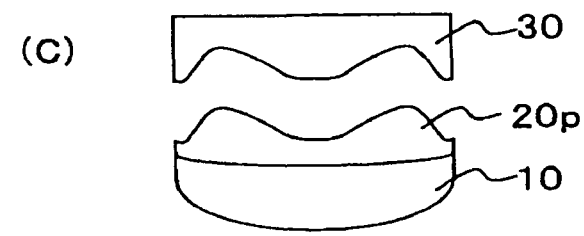
Figure 2:
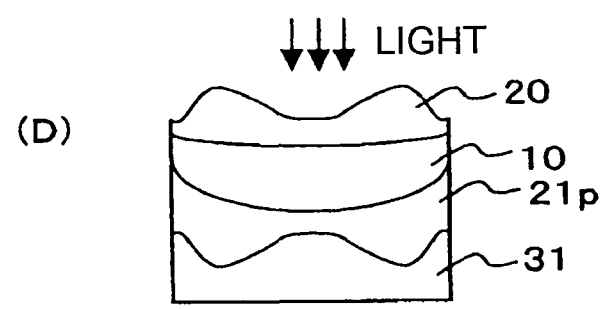
Figure 2:
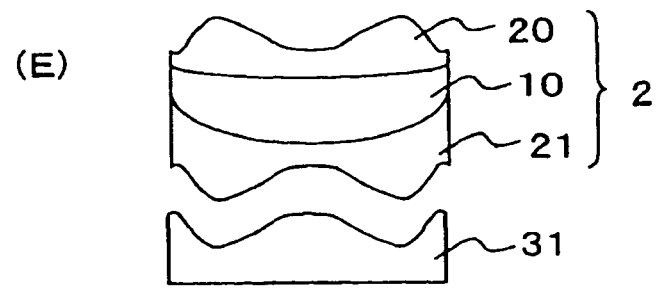
Figure 3:
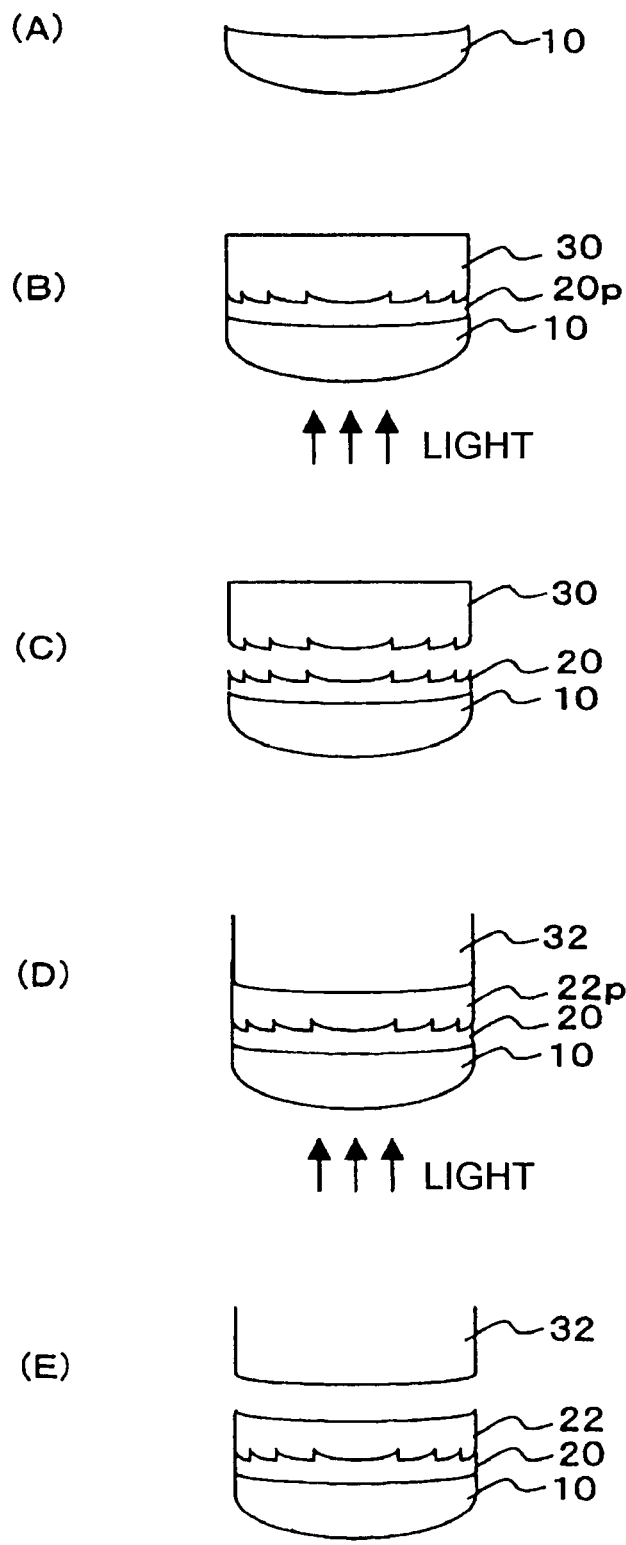
FIG. 3(A)-3(E) is a drawing showing production steps of a resin composite-type optical element (diffractive optical element) having two resin layers laid on one side of a base material.

FIGS. 1 to 3 are drawings showing production steps of resin composite-type optical elements and the resin composite-type optical elements obtained thereby in the present embodiment. FIG. 1 (A) to (C) concern the resin composite-type optical element having a resin layer 20 on one side of a base material 10. FIG. 2 (A) to (E) concern the resin composite-type optical element 2 having resin layers 20 and 21 on both sides of a base material 10. FIG. 3 (A) to (E) concern the resin composite-type optical element (diffractive optical element) 3 having two resin layers 20 and 22 on one side of a base material 10.

First, let us explain the resin composite-type optical element obtained by the production process of the resin composite-type optical element shown in FIG. 1. The resultant through the steps shown in FIG. 1 (A) to (C) is the resin composite-type optical element 1 in which the resin layer 20 is formed on one side of the base material 10, as shown in FIG. 1 (C).

As shown in FIG. 1, the resin composite-type optical element 1 consists of the base material 10, and the resin layer 20 cemented to this base material 10. In the case where the resin layer 20 is formed on one surface of the base material 10 like the resin composite-type optical element 1 shown in FIG. 1, a coat layer 13 may be formed on the surface of the base material 10 opposite to the resin layer 20.

The base material 10 is preferably a material demonstrating high transmittance to visible light. For example, a preferred material is one having the internal transmittance of not less than 80% for light of the wavelength of 400 nm. There are no particular restrictions on the material, but it can be sol-gel glass, inorganic glass, or the like. The base material 10 may be one that absorbs the ultraviolet light. For example, it is preferably one having the internal transmittance of not more than 50% for light of the wavelength of 360 nm in the thickness of 10 mm. In this case, it may be one in which the transmittance for the light of the wavelength of 360 nm is reduced by addition of an ultraviolet absorber. The base material 10 may be one made of resin by injection molding.

The resin layer 20 has the internal transmittance of not more than 3% for the light of the wavelength of 360 nm in the thickness of 100 μm. When the optical element produced is used with visible light, it needs to have high transmittance to the visible light. Therefore, the resin layer 20 has the internal transmittance of not less than 85% for the light of the wavelength of 400 nm in the thickness of 100 μm. Namely, in the resin composite-type optical element 1, this resin layer 20 corresponds to the "first resin layer".

The resin layer 20 is preferably one containing an ultraviolet absorber. When the ultraviolet absorber is added, it becomes easier to achieve the aforementioned internal transmittance for the light of the wavelength of 360 nm. As a result, the resin itself is improved in light resistance.

The resin layer 20 is preferably one having such light resistance that change in transmittance is not more than 1% in an accelerated light resistance test equivalent to one-year outdoor exposure. The light resistance test equivalent to one-year outdoor exposure can be carried out, for example, with a carbon fadometer under the conditions of the temperature of 63° C., the humidity of 45-55% RH, and the irradiation time of 160 hours.

The resin layer 20 is preferably one consisting of a cured product of a precursor composition (resin precursor) obtained by mixing predetermined components. The resin precursor is preferably one containing a resin or a precursor compound to form a resin by curing, in an optional combination with an ultraviolet absorber, a stabilizer, and so on. It is particularly preferred to use one containing an ultraviolet absorber as an essential component, as described above.

First, the precursor compound may be one of polyfunctional (meth)acrylates. Examples of the polyfunctional (meth)acrylates include bifunctional (meth)acrylates such as di(meth)acrylate of 2,2-dimethyl-3-hydroxypropyl-2,2-dimethyl-3-propionate, ethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, glycerin di(meth)acrylate, neopentyl glycol di(meth)acrylate, di(meth)acrylate of neopentyl glycol hydroxypivalate, di(meth)acrylate of an ethylene oxide adduct of bisphenol A, di(meth)acrylate of an propylene oxide adduct of bisphenol A, di(meth)acrylate of 2,2'-di(hydroxypropoxyphenyl)propane, di(meth)acrylate of 2,2'-di(hydroxyethoxyphenyl)propane, di(meth)acrylate of tricyclodecanedimethylol, and a di(meth)acrylic acid adduct of 2,2'-di(glycidyloxyphenyl)propane.

Further examples of the precursor compound include trimethylolpropane tri(meth)acrylate, pentaerythritol (meth)acrylate, pentaerythritol tetra(meth)acrylate, dipentaerythritol hexa(meth)acrylate, tetramethylolmethane tri(meth)acrylate, tetramethylolmethane tetra(meth)acrylate, tri(meth)acrylate of tris(2-hydroxyethyl)isocyanurate, tri(meth)acrylate of tris(hydroxypropyl)isocyanurate, tri(meth)acrylate of trimellitic acid, triallyl trimellitate, triallyl isocyanurate, and so on.

Furthermore, the precursor compound may be one of monofunctional (meth)acrylates. Examples thereof include methyl (meth)acrylate, ethyl(meth)acrylate, cyclohexyl (meth)acrylate, cyclopentyl(meth)acrylate, isoboronyl (meth)acrylate, boronyl (meth)acrylate, phenyl(meth)acrylate, benzyl(meth)acrylate, α-naphthyl(meth)acrylate, β-naphthyl(meth)acrylate, dicyclopentenyloxyethyl(meth) acrylate, and so on.

It should be noted that in the present specification an acrylate and a methacrylate are referred to collectively as "(meth) acrylate," which means cases of inclusion of either or both of the acrylate and methacrylate.

Furthermore, the precursor compound may contain an oligomer such as a urethane acrylate or an epoxy acrylate. The precursor compound may consist of a photocurable resin precursor (e.g., an epoxy type, oxetane type, or vinyl ether type precursor) other than the acrylates.

Examples of the ultraviolet absorber include the compounds as described below.

Namely, examples of benzophenone type ultraviolet absorbers include ADK STAB 1413 (Asahi Denka Co., Ltd), and UVINUL 3049 UVINUL 3050, and UVA-635L (BASF); examples of benzoate type ultraviolet absorbers include ADK STAB LA-12 (Asahi Denka Co., Ltd), KEMISORB 22 (CHEMIPRO KASEI KAISHA, LTD.), and SEESORB202 (SHIPRO KASEI KAISHA, LTD.); examples of benzotriazole type ultraviolet absorbers include TINUVIN PS, TINUVIN99-2, TINUVIN109, TINUVIN328, TINUVIN384-2, TINUVIN 900, TINUVIN928, TINUVIN213, TINUVIN326, TINUVIN327, TINUVIN P, TINUVIN320, TINUVIN517, TINUVIN234, and TINUVIN1130 (Ciba Specialty Chemicals Inc.), ADK STAB LA-31, ADK STAB LA-32, ADK STAB LA-34, and ADK STAB LA-36 (Asahi Denka Co., Ltd), UVINUL 5411 and UVA-1635 (BASF), RUVA-93 (Otsuka Chemical Co., Ltd.), PR-25 (Clariant K.K.), and SEESORB701, SEESORB702, SEESORB703, SEESORB703G, SEESORB704, SEESORB705, SEESORB706, SEESORB707, and SEESORB709 (SHIPRO KASEI KAISHA, LTD.); examples of hydroxyphenyltriazine type ultraviolet absorbers include TINUVIN400, TINUVIN405, TINUVIN411L, and TINUVIN1577 (Ciba Specialty Chemicals Inc.), and CYAGARD UV-1164 (Cytec Industries Inc.); examples of cyanoacrylate type ultraviolet absorbers include UVINUL3030, UVINUL3035, and UVINUL3039 (BASF); and examples of oxanilide type ultraviolet absorbers include GIVSORB UV-1 (Givaudan Corporation).

These ultraviolet absorbers have the structures represented by the chemical formulae below.

[Chem 1]

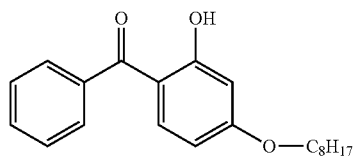

ADK STAB 1413

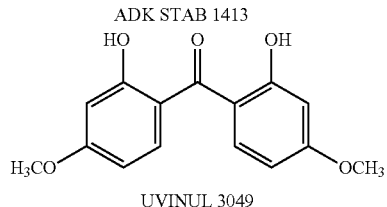

UVINUL 3049

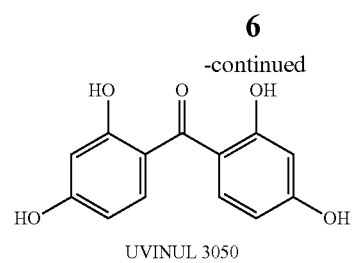

UVINUL 3050

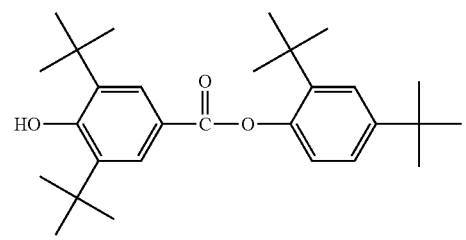

ADK STAB LA-12

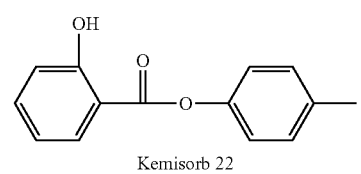

Kemisorb 22

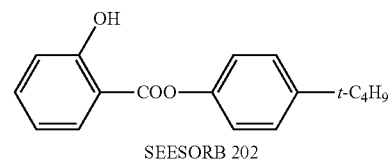

SEESORB 202

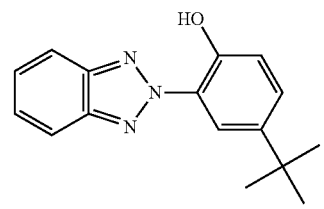

TINUVIN PS

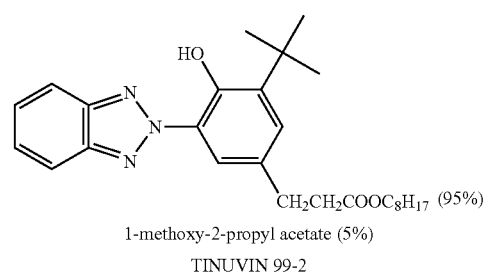

1-methoxy-2-propyl acetate (5%)

TINUVIN 99-2

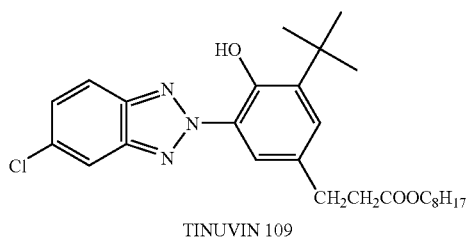

TINUVIN 109

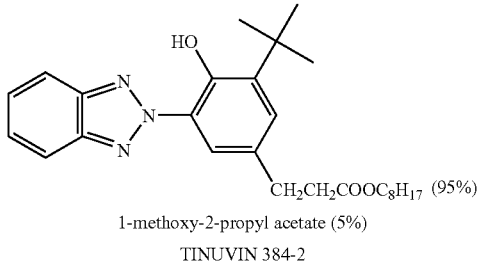
1-methoxy-2-propyl acetate (5%)
TINUVIN 384-2
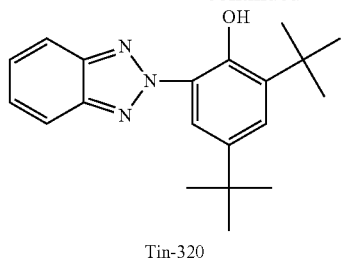
Tin-320
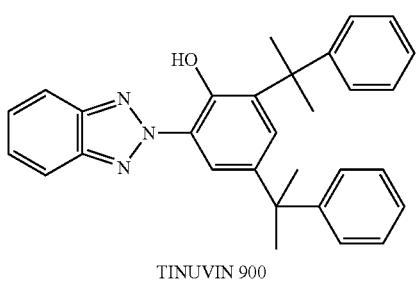
TINUVIN 900
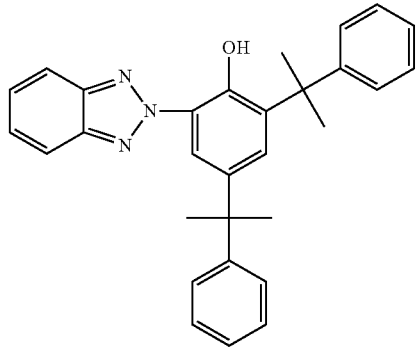
Tin-234
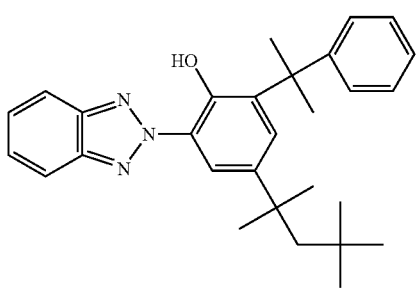
TINUVIN 926
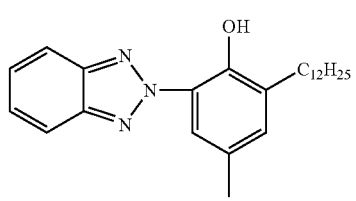
Tin-517
[Chem 2]
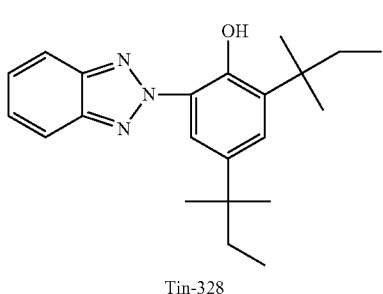
Tin-328
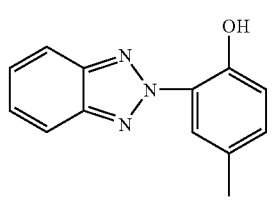
ADK STAB LA-32
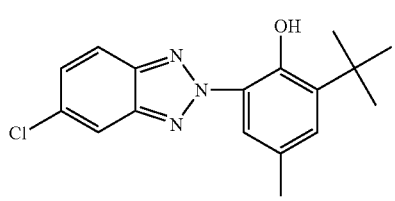
ADK STAB LA-36
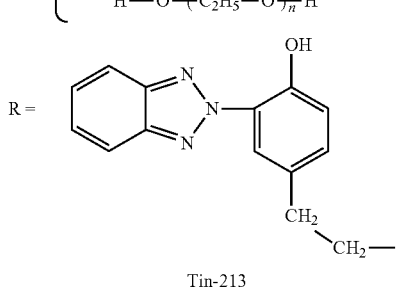
Tin-213
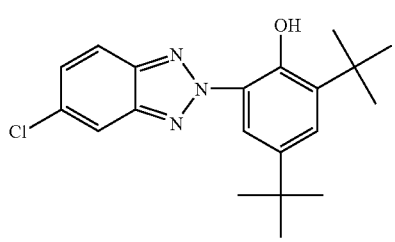
LA-34
Tin-327

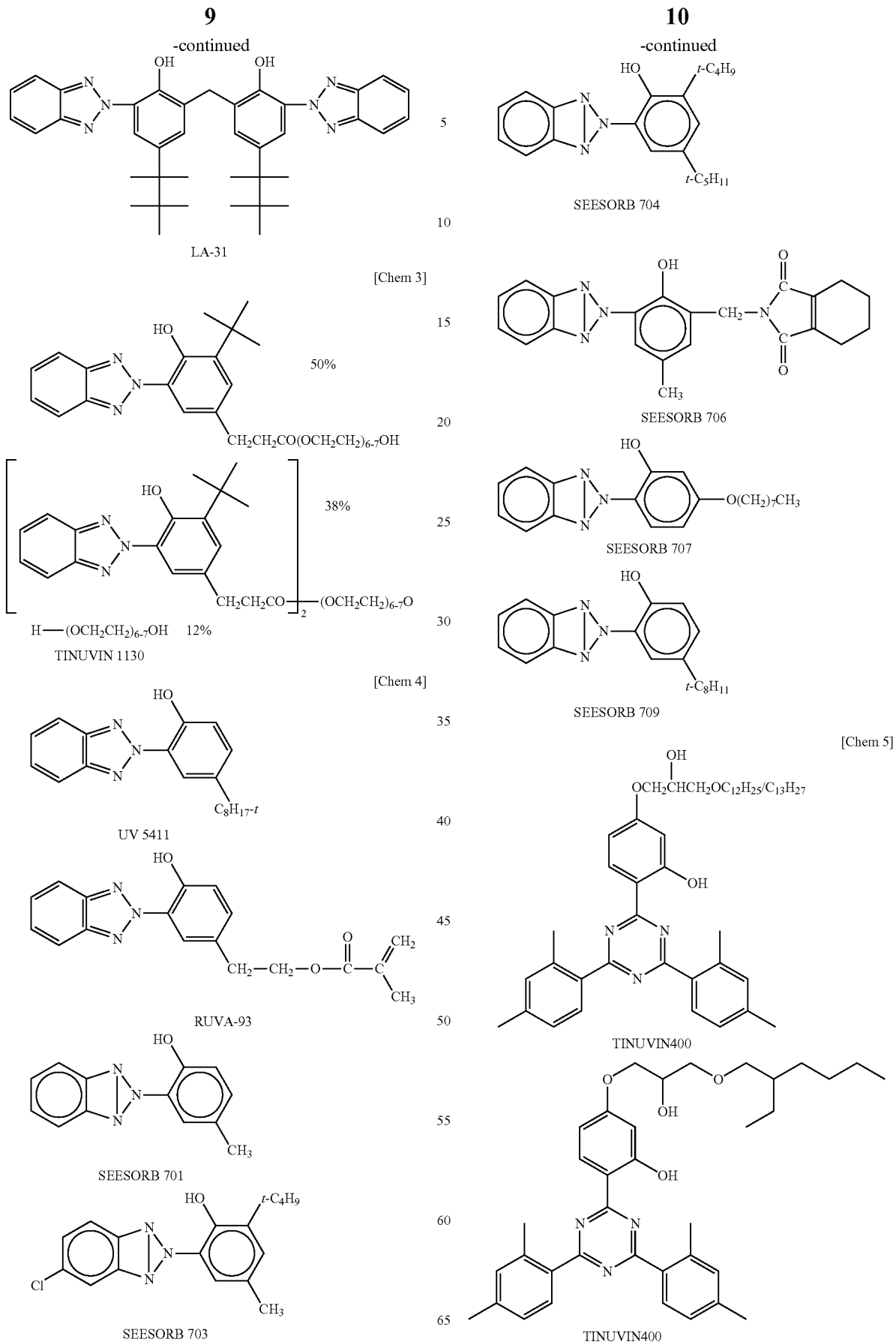

-continued

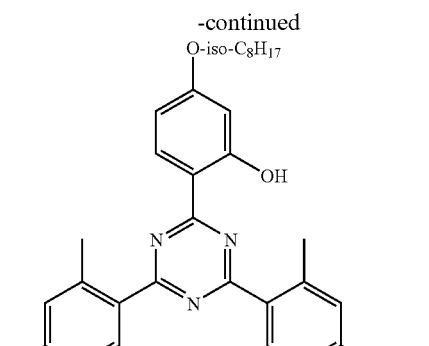

Xylene 35%
TINUVIN 411L

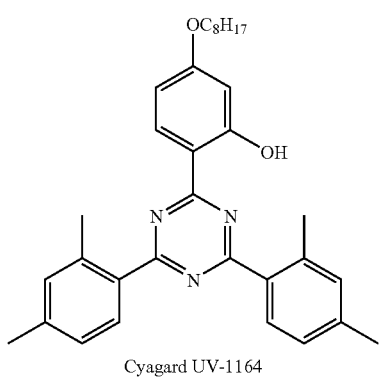

2-(4,6-Diphenyl-1,3,5-triazin-2-yl)-5-(hexyl)oxyl-phenol
TINUVIN 1577

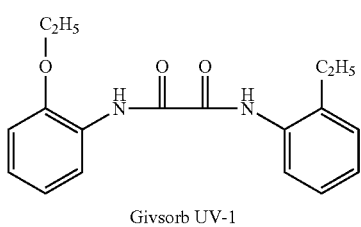

Givsorb UV-1

[Chem 6]

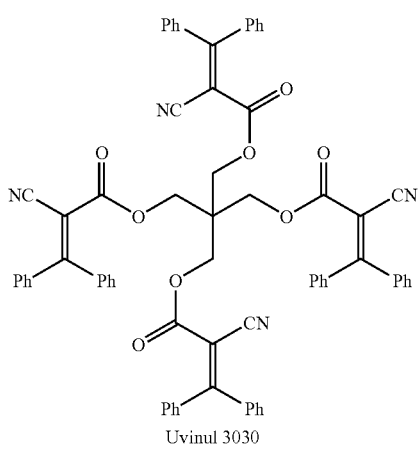

Uvinul 3030

-continued

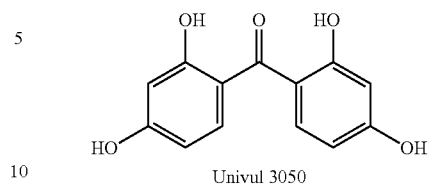

Univul 3050

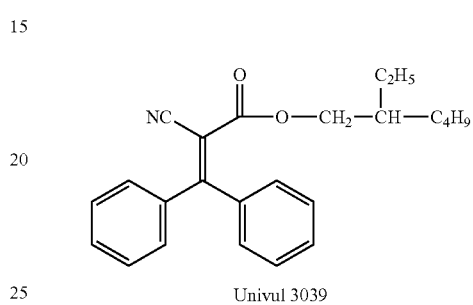

Univul 3039

The ultraviolet absorber is preferably one of the benzotriazole type and the dihydroxybenzophenone type ultraviolet absorbers among these examples because they show excellent absorption capacity and stability, and it is particularly preferred to adopt a benzotriazole type ultraviolet absorber. The ultraviolet absorber may be one added singly, or may be two or more of the above examples added in combination.

A necessary addition amount of the ultraviolet absorber is such an amount that the resin layer 20 can absorb a satisfactory amount of ultraviolet light. For example, the addition amount is preferably from 0.1 to 15% by weight and more preferably from 0.5 to 10% by weight relative to the resin precursor for forming the resin layer 20. If the amount is less than 0.1% by weight, a sufficient ultraviolet absorption effect might not be obtained. On the other hand, if the amount is more than 15% by weight, it might be difficult to mix the ultraviolet absorber.

The resin precursor for forming the resin layer 20 preferably further contains a stabilizer, particularly, a hindered amine type stabilizer. This further improves the ultraviolet resistance of the resin layer 20.

There are no particular restrictions on the type of the stabilizer, but examples thereof include TINUVIN123, TINUVIN144, TINUVIN292, TINUVIN770, CHIMASSORB944, and TINUVIN622 (Ciba Specialty Chemicals Inc.), ADK STAB LA-77, ADK STAB LA-57, ADK STAB LA-52, ADK STAB LA-68, ADK STAB LA-63, ADK STAB LA-82, ADK STAB LA-87, and ADK STAB LA-62 (Asahi Denka Co., Ltd.), UVINUL5050H, UNINUL4049H, and UNINUL4050H (BASF), Sanol LS-770, Sanol LS-765, and Sanol LS-292 (Sankyo Lifetech Co., Ltd.), bis(2,2,6,6-tetramethyl-4-piperidyl) sebacate, bis(1,2,2,6,6-pentamethyl-4-piperidyl)sebacate, methyl(1,2,2,6,6-pentamethyl-4-piperidyl)sebacate, and so on.

These stabilizers have the structures represented by the chemical formulae below.

[Chem 7]
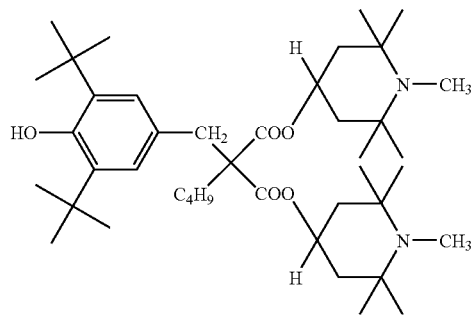
TINUVIN 144
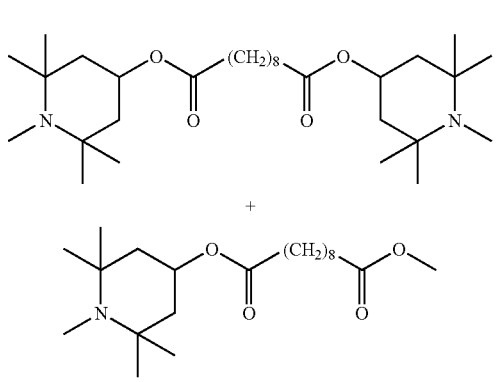
TINUVIN 292
[Chem 8]
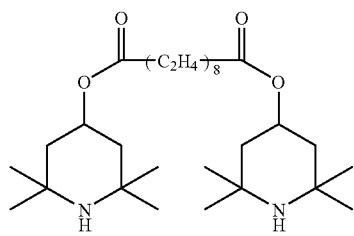
LS-770
TINUVIN 770
ADEKA STAB LA-77
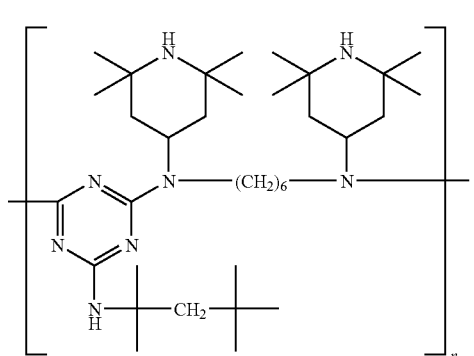
Chimassorb 944
M: 2000-3000
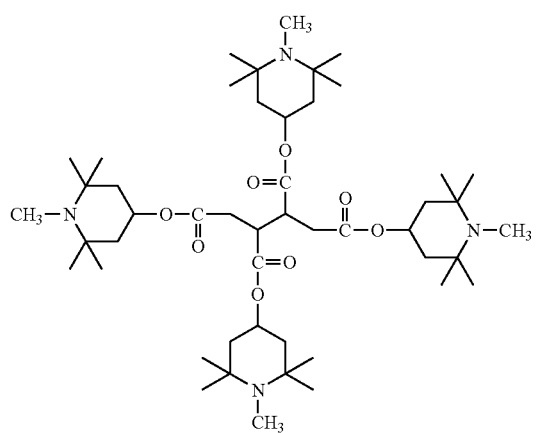
LA-52
MW847
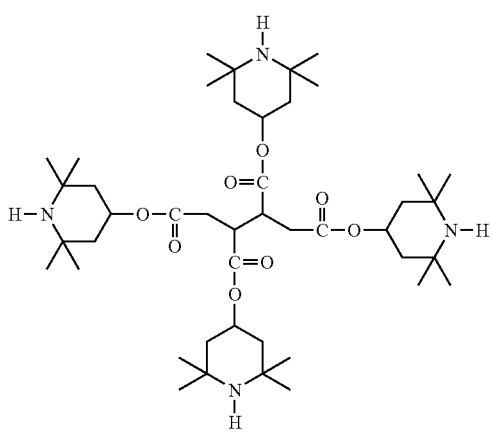
LA-57
MW791

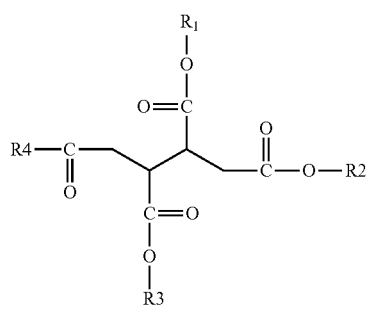
-continued
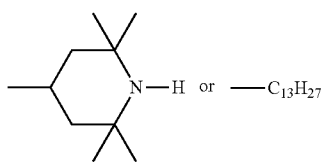
LA-62
R1, R2, R3, R4 =
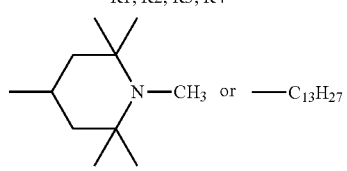
LA-67
R1, R2, R3, R4 =
[Chem 9]
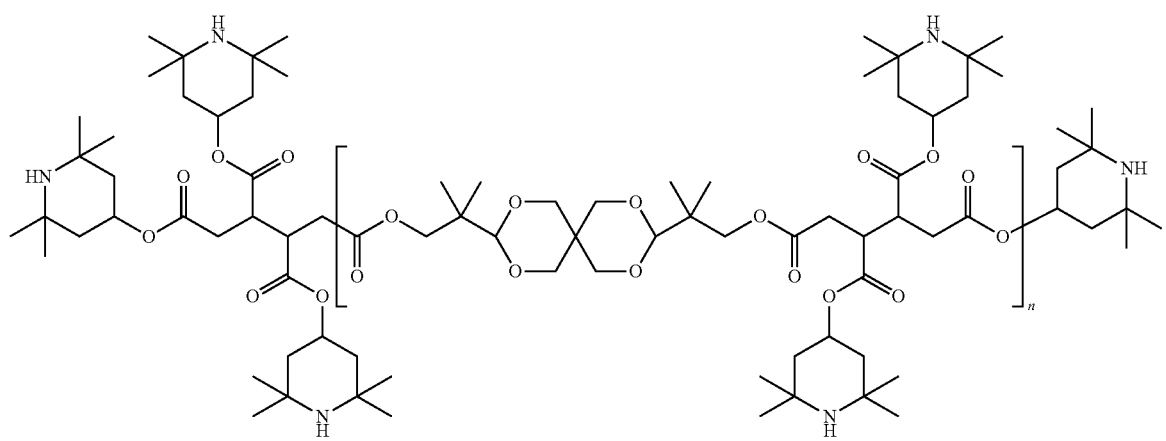
ADK STAB LA-68
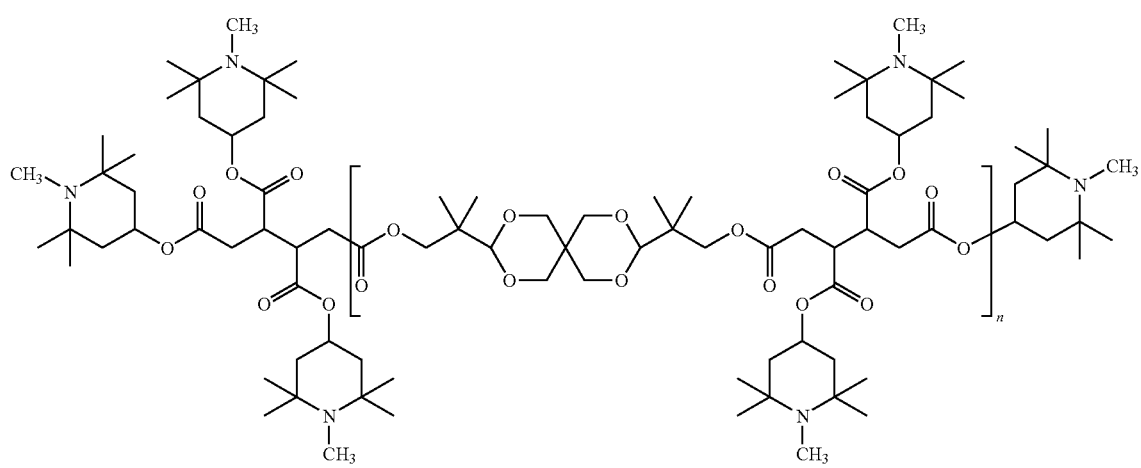
ADK STAB LA-63
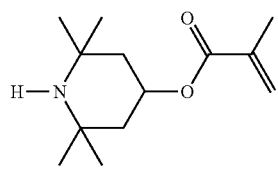
ADK STAB LA-87
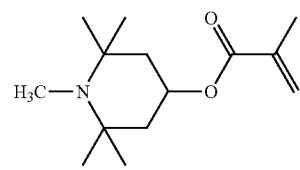
ADK STAB LA-82

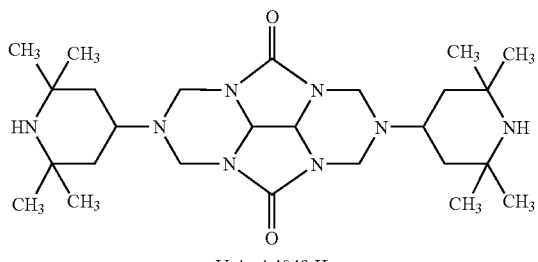
Uvinul 4049 H

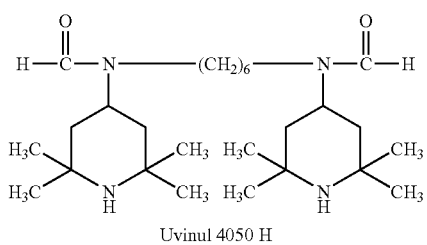
Uvinul 4050 H

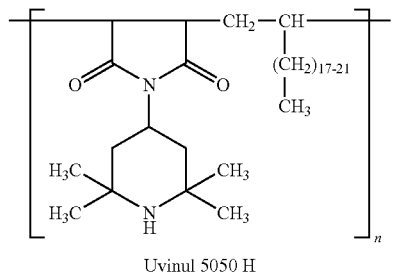
Uvinul 5050 H

The stabilizer (hindered amine type stabilizer) may be one added singly, or may be two or more of the above examples added in combination. It is preferable to select them, taking the solubility in the resin precursor into consideration.

A concentration of the stabilizer, for example, in the case of the hindered type stabilizer, is preferably from 0.1 to 5% by weight and more preferably from 0.5 to 3% by weight relative to the resin precursor. If the concentration of the stabilizer is less than 0.1% by weight, a sufficient stabilization effect might not be obtained. On the other hand, if the concentration is more than 5% by weight, it might be difficult to mix the stabilizer, or it might not affect the light resistance so much.

Furthermore, the resin precursor for forming the resin layer 20 can optionally contain, in addition to the resin (or the resin precursor), a polymerization agent (curing agent), a polymerization initiator, a release agent, an abrasion-resistant agent, and so on if necessary.

For example, the photopolymerization initiator is preferably one having the molar absorption coefficient of not less than 5 at 405 nm, in order to cure the resin precursor with light of a wavelength of not less than 400 nm. When the molar absorption coefficient is not less than 5, the resin can be cured in a relatively short period of time with light of not less than 400 nm, thereby obtaining the resin layer 20 with excellent ultraviolet absorption capacity. If the molar absorption coefficient of the photopolymerization initiator is less than the value, the resin or resin precursor will be unlikely to cure, and curing will take some time.

There are no particular restrictions on the photopolymerization initiator with absorption on the relatively long wavelength side, but it may be an acylphosphine type photopolymerization initiator. Examples of the acylphosphine type photopolymerization initiator include bis(2,4,6-trimethylbenzoyl)-phenylphosphine oxide, 2,4,6-trimethylbenzoyl-diphenyl-phosphine oxide, and so on. Examples of commercially available products include IRGACURE819, IRGACURE1800, IRGACURE1870, DAROCURE TPO, and DAROCURE 4265 (Ciba Specialty Chemicals Inc.).

These photopolymerization initiators have the structures represented by the chemical formulae below.

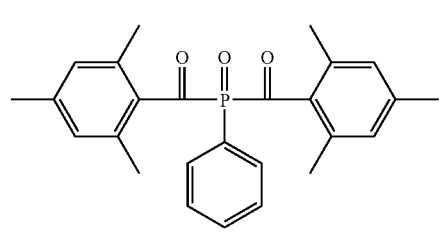
IRGACURE819

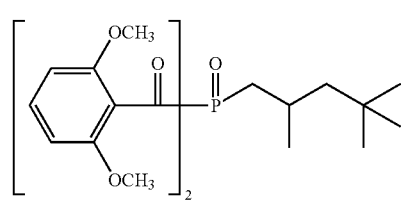
IRGACURE1800

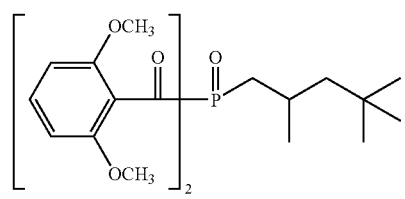
IRGACURE1870

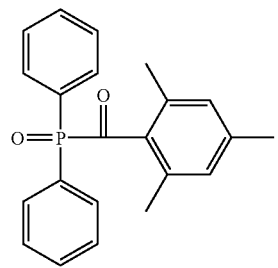
DAROCUR TPO

-continued

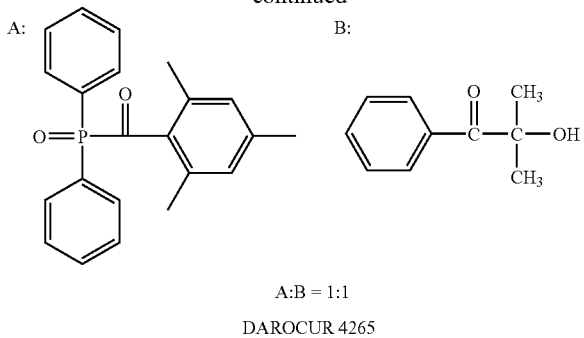

A:B = 1:1

DAROCUR 4265

The photopolymerization initiator may be one added singly, or may be two or more of the above examples and others added in combination.

The resin composite-type optical element 1 may be provided with a coat layer 13 formed on the surface of the base material 10 opposite to the resin layer 20, as shown in FIG. 1. In this case, the coat layer 13 is preferably formed so that the surface 12 of the coat layer 13 has the reflectance of not more than 1% for light of wavelengths from 400 nm to 700 nm and not less than 2% for the light of the wavelength of 360 nm. The coat layer 13 is a coating formed, for example, by depositing a thin film on the surface of the base material 10.

Since the reflectance is kept low over the entire visible range by formation of the coat layer 13 or the like, the resin composite-type optical element 1 can be improved in its performance, e.g., reduction of flare light. On the other hand, in the case where the reflectance was high in the ultraviolet region and where the resin layer was made using a resin precursor to cure with ultraviolet light as in the conventional technology, a sufficient quantity of light did not reach the resin and the resin precursor failed to cure enough. However, since the resin composite-type optical element 1 uses the resin precursor which cures with light of the wavelength of not less than 400 nm, as described above, the reflectance in the ultraviolet region is insignificant. For this reason, it is easy to design a film for formation of the coat layer 13.

The below will describe the resin composite-type optical elements obtained by the production processes of the resin composite-type optical elements shown in FIGS. 2 and 3.

The resin composite-type optical element does not have to be limited to the optical element wherein the resin layer is formed as a single layer on the base material, as shown in FIG. 1 (C), but may be one wherein a plurality of resin layers are formed on the base material. For example, the resin composite-type optical element 2 shown in FIG. 2 (E) is an optical element wherein a resin layer 20 is provided on one surface of the base material 10 and a resin layer 21 on the other surface. The resin composite-type optical element 3 shown in FIG. 3 (E) is an optical element wherein two resin layers 20 and 22 are laid on one surface of the base material 10. In the case where the resin layer is provided on each of the both surfaces of the base material 10 like the resin composite-type optical element 2, the resin layer on either surface or the resin layers on the both surfaces may be a stack of resin layers.

It is sufficient in these resin composite-type optical elements that at least one layer out of the plurality of resin layers be the same as the resin layer 20 shown in FIG. 1, i.e., one made of the cured product of the resin precursor (precursor composition) as described above (the first resin layer), but all the resin layers may be layers corresponding to the first resin layer. In cases where the optical element has a plurality of first resin layers, these first resin layers may be layers made from a resin precursor having the same composition or may be layers made from different resin precursors.

The resin composite-type optical elements of the present embodiment configured as described above tend to have the transmittance of not more than 3% for the light of the wavelength of 360 nm. Such a resin composite-type optical element can be used as a lens, prism, or diffractive optical element according to the shape thereof. Particularly, it can be used as an aspherical optical element. Furthermore, it is suitable for purposes of correction for aberration and reduction of weight in binoculars, spectacles, cameras, and so on.

The preferred processes for producing the resin composite-type optical elements of the above-described embodiment will be described below with reference to FIGS. 1 to 3.

FIG. 1 is a drawing showing production steps of the resin composite-type optical element (aspherical optical element) having a resin layer on one side of the base material. In the production process shown in FIG. 1, the base material 10 is prepared (FIG. 1 (A)), the resin precursor 20p is filled between the base material 10 and a mold (die or the like) 30 opposed to each other, and light is applied from the base material 10 side to cure the resin precursor, thereby forming the resin layer 20 (FIG. 1 (B)). Thereafter, the mold 30 is moved away (FIG. 1 (C)) to obtain the resin composite-type optical element 1.

FIG. 2 is a drawing showing production steps of the resin composite-type optical element (aspherical optical element) having a resin layer on each of the two sides of the base material. In the production process shown in FIG. 2, first, the base material 10 is prepared (FIG. 2 (A)), the resin precursor 20p is filled between the base material 10 and the mold 30 opposed to each other, and light is applied from the base material 10 side to cure the resin precursor 20p, thereby forming the resin layer 20 (FIG. 2 (B)). Thereafter, the mold 30 is moved away (FIG. 2 (C)). Then another mold 31 is opposed to the surface of the base material 10 opposite to the resin layer 20, the resin precursor 21p is filled between them, and in this state, light is applied from the resin layer 20 side to cure the resin precursor 21p, thereby forming the resin layer 21 (FIG. 2 (D)). Thereafter, the mold 31 is moved away (FIG. 2 (E)) to obtain the resin composite-type optical element 2.

FIG. 3 is a drawing showing production steps of the resin composite-type optical element (diffractive optical element) having two resin layers laid on one side of the base material. In the production process shown in FIG. 3, first, the base material 10 is prepared (FIG. 3 (A)), the resin precursor 20p is filled between the base material 10 and the mold 30 opposed to each other, and light is applied from the base material 10 side to cure the resin precursor 20p, thereby forming the resin layer 20 (FIG. 3 (B)). Thereafter, the mold 30 is moved away (FIG. 3 (C)). Then another mold 32 is opposed to the resin layer 20, the resin precursor 22p is filled between them, and in this state, light is applied from base material 10 side to cure the resin precursor 22p, thereby forming the resin layer 22 (FIG. 3 (D)). Thereafter, the mold 32 is moved away (FIG. 3 (E)) to obtain the resin composite-type optical element 3.

In these production processes, the resin layers 20, 21, 22 in the resin composite-type optical elements 1, 2, 3 are formed using the molding dies 30, 31, 32 (e.g., metal dies, resin dies, etc.) whose molding surfaces are inverted shapes from the shapes of the resin layers 20, 21, 22, as shown in FIGS. 1 to 3.

The resin layer(s) in each composite-type optical element is preferably formed so that at least one layer thereof is made by applying light of the wavelength of not less than 400 nm to cure the resin precursor. The reasons for it are as described below.

Namely, when the base material 10 has the ultraviolet absorbing function, no ultraviolet light reaches the resin precursor, or even if some ultraviolet light reaches the resin precursor the illuminance thereof will be low. Therefore, the resin precursor to be used cannot be one to cure with ultraviolet light. For this reason, it is preferable to cure the precursor with light of the wavelength of not less than 400 nm which is visible light.

In the case where the resin precursor to form the resin layer 20 has the ultraviolet absorbing function, the resin does not cure with ultraviolet light, either, or is unlikely to cure. For this reason, it is preferable to cure the resin with light of the wavelength of not less than 400 nm. Furthermore, in the case where a plurality of resin layers are formed, it is sometimes the case that another resin precursor is cured with light having passed through the resin having the ultraviolet absorbing function. In that case, no ultraviolet light reaches the other resin precursor, or even if some ultraviolet light reaches the other resin precursor the illuminance thereof will be low. In this case, therefore, the resin precursor to be used cannot be one to cure with ultraviolet light. Therefore, it is necessary to cure the resin with light of the wavelength of not less than 400 nm.

A material of the molds 30, 31, 31 is preferably metal. There are molds made of a transparent material (e.g., quartz). In that case, the resin precursor can be cured by applying light from the mold side.

In the case where the coat layer 13 is provided on the surface of the base material 10 as shown in FIG. 1, a step of forming the coat layer 13 can be carried out prior to formation of the resin layer 20 by irradiation with light. If the coat layer 13 is formed after formation of the resin layer 20, the substrate may not be heated in the film forming step of the coat layer 13. This is because the resin layer 20 can deteriorate with heat. On the other hand, if the coat layer 13 is formed without heating, adhesion will be lowered between the base material 10 and the coat layer 13. Therefore, the coat layer 13 is to be formed prior to the formation of the resin layer 20 on the base material 10, which allows the substrate to be heated at 100° C. or higher, without deterioration of the resin layer 20, and which facilitates achievement of good adhesion between the base material 10 and the coat layer 13.

The above described the resin composite-type optical elements and production processes thereof as a mode of the present invention. The embodiment of the present invention provides the resin composite-type optical elements capable of cutting off the ultraviolet light by themselves, particularly, without provision of an extra member dedicated to absorption of ultraviolet light only. The foregoing embodiment can be modified in various ways within the scope of the technical idea of the present invention.

Further preferred embodiments of the present invention will be described below.

First, the following will describe an application of the resin composite-type optical element of the embodiment of the present invention to an aspherical optical element (aspherical lens).

There is a method of increasing the refractive index of the resin (resin layer), as a method of molding the aspherical optical element easier than before without deterioration of the conventionally-achieved optical performance. Namely, when a resin with a higher refractive index is applied to the resin composite-type optical element, the aspheric effect equivalent to that with a larger asphericity quantity can be achieved with a smaller asphericity quantity. A lens with a smaller asphericity quantity is superior in moldability to a lens with a larger asphericity quantity. Therefore, moldability is improved by the increase in the refractive index of the resin.

As described above, for enhancing the effect of the aspherical surface without change in the aspherical shape, it is effective to increase the refractive index of the resin. Particularly, when the refractive index is 1.55 or more, degrees of freedom of design of aspherical surface are further increased and aspherical lenses applicable to various uses are obtained.

The refractive indices of the resins used in the resin layers of the conventional aspherical optical elements were approximately 1.50. Use of the resin with the refractive index of not less than 1.55 allows the thickness of the resin layer to be made smaller than before. As a result, moldability is enhanced and an amount of resin used becomes smaller, so as to achieve reduction of cost. However, the conventional resins achieving high refraction had low resistance to the ultraviolet light and for this reason, their light resistance tends to worsen. In contrast to it, the present embodiment makes it feasible to achieve high refraction and high light resistance together, by forming the resin layer 20 (first resin layer) as in the aforementioned embodiment shown in FIG. 1.

In the resin composite-type optical element used as an aspherical optical element, the resin layer (first resin layer) with the foregoing properties being excellent is preferably one consisting of a cured product of a photosensitive resin composition (resin precursor) containing:

(A) a polyfunctional (meth)acrylate;

(B) a polyfunctional urethane-modified (meth)acrylate; and (C) a photopolymerization initiator.

These components (A) to (C) are preferably contained as major components. The major components herein refer to components forming a skeleton structure of the cured product.

The viscosity before polymerization curing of the resin layer (i.e., the photosensitive resin composition) in this resin composite-type optical element is preferably not more than 50000 cP at room temperature. If it is over 50000 cP, workability will degrade and defective products will increase due to incorporation of bubbles.

In general, the resin changes its refractive index before and after curing. For this reason, for obtaining a desired refractive index after curing, it is necessary to determine the composition of the resin with consideration to the change in the refractive index before and after curing. Therefore, we examined the change in the refractive index before and after curing in detail, as to the aforementioned photosensitive resin composition. It was found as a result of the examination that when the refractive index before curing was not less than 1.52, the refractive index after curing became 1.55 or more. Therefore, the photosensitive resin composition used in production of the resin composite-type optical element of this form is preferably one having the refractive index of not less than 1.52 before curing.

For making the resin before curing (photosensitive resin composition) have the refractive index of not less than 1.52, the polyfunctional (meth)acrylate of composition (A) alone preferably has the refractive index of not less than 1.53 in the composition containing the aforementioned components (A) to (C). Such a polyfunctional (meth)acrylate having the refractive index of not less than 1.53 is preferably selected from those having two or more benzene ring structures in one molecule.

Among others, the inventors conducted elaborate research and found that a di(meth)acrylate represented by General Formula (I) below was particularly preferable as the component (A). Particularly, of di(meth)acrylates represented by General Formula (I), those with the molecular weight of not more than 1000 are more preferable because their refractive index is larger.

[Chem 12]

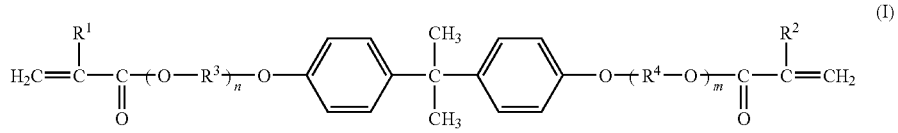

(I)

(In the above formula, each of $R^1$ and $R^2$ is a hydrogen or methyl group, each of $R^3$ and $R^4$ is a hydrocarbon group having two to four carbons, and each of m and n is an integer of not less than 1.)

Component (A) may consist of one polyfunctional (meth)acrylate or may consist of two or more polyfunctional (meth)acrylates. This component (A) functions to increase the refractive index of the resin layer in the resin composite-type optical element. For this reason, the refractive index before curing of component (A) is preferably not less than 1.53.

When the polyfunctional (meth)acrylate has the benzene rings, the molecular weight tends to increase, whereas the viscosity of the resin becomes too high if the molecular weight is too large. On the other hand, as the structure $(R^3—O)_n$ and/or $(R^4—O)_m$ other than the benzene rings in General Formula (I) becomes larger, the viscosity decreases, but the refractive index also tends to decrease. Then the inventors conducted comparative studies on the polyfunctional (meth)acrylates with various molecular weights and found that the appropriate molecular weight of the polyfunctional (meth)acrylate of component (A) was not more than 1000.

A proportion of component (A) is preferably a weight percentage in the range of 10 to 95% in the photosensitive resin composition. If the proportion is below the range, the refractive index of the resin layer will tend to become not more than 1.55. If it is contained over the range, the environment resistance of the resin layer will degrade.

The below will describe an application of the resin composite-type optical element of the embodiment of the present invention to a diffractive optical element.

Among the diffractive optical elements, a contact multilayer diffractive optical element wherein two optical members of optical materials are in close contact and wherein an interface between them constitutes a diffraction grating, can widen the band of usable wavelengths and has the advantage that alignment between gratings is easy.

In this contact multilayer diffractive optical element, the optical members on both sides of the diffractive optical surface are required to have optical properties of relatively high refractive index and low dispersion, and, relatively low refractive index and high dispersion.

For example, glass can be used as a general, high index, low dispersion material. In the contact multilayer diffractive optical element, when one of the two optical members is such a high index, low dispersion glass, the other needs to be an optical material with a relatively lower refractive index and higher dispersion than the glass.

The resin composite-type optical element of the embodiment of the present invention is also applicable as a contact multilayer diffractive optical element wherein a diffraction grating is formed on a glass surface of a low-melting-point glass by the glass molding method and wherein a resin layer is molded as a molded product of a photocurable resin on the glass surface.

For example, in the case where the resin composite-type optical element 1 shown in FIG. 1 is used as a diffractive optical element, a glass with a high refractive index and low dispersion is applied to the base material 10 and one of the materials described below is applied to the resin layer 20.

The resin layer 20 is preferably one obtained by curing a precursor containing a polyfunctional (meth)acrylate containing two or more aromatic rings in one molecule. Such resin has high dispersion. Since the glass of the base material 10 has the high refractive index, any resin having a refractive index lower than it can be enough to be used as a diffractive optical element. The polyfunctional (meth)acrylate containing two or more aromatic rings in one molecule can be a di(meth)acrylate represented by General Formula (I) above.

Besides the polyfunctional (meth)acrylate, the resin layer 20 may be made by applying one of the constituent materials of the resin layer 20 in the above embodiment or one of resins with high refraction and low dispersion or with low refraction and high dispersion described below. Among others, the below-described, low refraction, high dispersion resins are preferably applicable because it is possible to achieve an excellent diffraction efficiency.

In the diffractive optical element, the two optical members with the relatively high refractive index and low dispersion and with the relatively low refractive index and high dispersion both can also be made of resin. For example, the resin composite-type optical element shown in FIG. 3 can be formed in a configuration wherein either one of the resin layers 20 and 22 has the high refractive index and low dispersion and the other the low refractive index and high dispersion. In this case, these two layers are preferably layers corresponding to the first resin layer as described above, but it is also possible to adopt a configuration wherein only at least one layer is a layer corresponding to the first resin layer.

The resin layer with the high refractive index and low dispersion herein is preferably, for example, one consisting of a cured product of a resin precursor containing an acrylate-terminal oligomer obtained by addition of an excess amount of a bifunctional acrylate to a bifunctional thiol, and a photopolymerization initiator.

The resin with the low refractive index and high dispersion is desirably a resin consisting of a cured product of a resin precursor containing a bifunctional fluorinated (meth)acrylate, a bifunctional (meth)acrylate with the fluorene structure, and a photopolymerization initiator.

Specific examples of such resins include the resins described in International Publication WO06/068137 and the resins described in International Publication WO06/068138.

The resin layer with the low refractive index and high dispersion as described above preferably satisfies, particularly, the requirements of the resin layer 20 (first resin layer) in the above embodiment, i.e., the conditions that it has the internal transmittance of not less than 85% for light of the wavelength of 400 nm in the thickness of 100 μm and the internal transmittance of not more than 3% for light of the wavelength of 360 nm in the thickness of 100 μm. This allows the resin layer with the low refractive index and high dispersion to function as a layer capable of absorbing the ultraviolet light and allows the diffractive optical element to function as an element capable of cutting off the ultraviolet light. Particularly, in the above-described resin with the low refractive index and high dispersion, the bifunctional (meth)acrylate with the fluorene structure tends to comparatively deteriorate under irradiation with ultraviolet light and to change its color into yellow. In contrast to it, when the resin layer has the properties satisfying the above-described conditions, the resin layer becomes unlikely to deteriorate.

For making the resin layer with the low refractive index and high dispersion satisfy the above conditions, the layer preferably contains an ultraviolet absorber.

Base material B: ACRYPET VH (available from MITSUBISHI RAYON CO., LTD.), a plastic absorbing ultraviolet light.

Base material a: E-BK7 (available from HIKARI GLASS CO., LTD.), a glass not absorbing ultraviolet light.

The materials had the following internal transmittances in the thickness of 10 mm at 360 nm.

Base material A: transmittance of 48%.
Base material B: transmittance of 3%.
Base material a: transmittance of 99%.

<Resin Precursor>

Resin precursor A: resin precursor obtained by mixing structural formula (1) (molecular weight 800) below and structural formula (2) below at 80:20 (weight ratio) and adding an ultraviolet absorber of SEESORB 709 2 wt % and a photopolymerization initiator of IRGACURE 819 0.2 wt %.

[Chem 13]

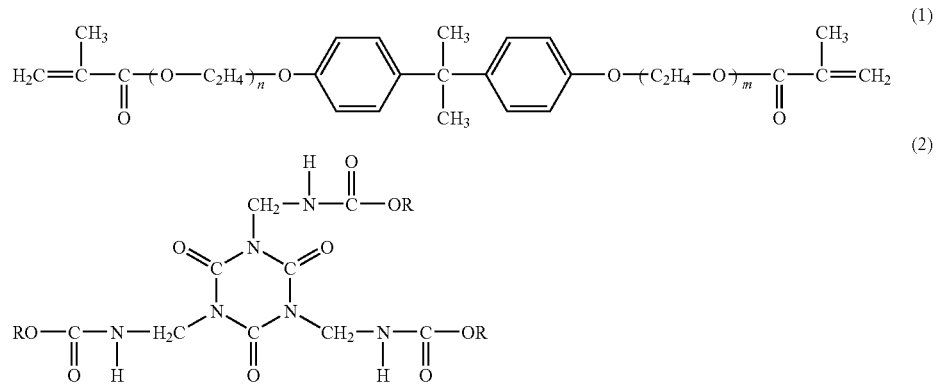

Particularly, a resin layer consisting of a cured product of a resin precursor containing a combination of a bifunctional fluorinated (meth)acrylate, a bifunctional (meth)acrylate with the fluorene structure, a photopolymerization initiator, and, at least one ultraviolet absorber out of a benzotriazole type ultraviolet absorber and a dihydroxybenzophenone type ultraviolet absorber, or an ultraviolet absorber having the molar absorption coefficient of not less than 500 at the wavelength of 380 nm, tends to exhibit excellent light resistance. The benzotriazole type ultraviolet absorber and the dihydroxybenzophenone type ultraviolet absorber have absorption maxima near 300 nm and near 340 nm and thus have large absorption to the visible region of not less than 400 nm because of the influence of the absorption maximum near 340 nm; therefore, they can effectively absorb light of relatively long wavelengths that can cause the yellowing of the resin with the fluorene structure, and it is thus considered that they can provide excellent ultraviolet absorption capacity and light resistance.

EXAMPLES

The present invention will be described below in more detail with examples, but the present invention is by no means intended to be limited to these examples.

1. Production of Aspherical Optical Elements (cf. FIG. 1)
1-1. Materials
<Base Material>
Base material A: E-BAF8 (available from HIKARI GLASS CO., LTD.), a glass absorbing ultraviolet light.

where R is

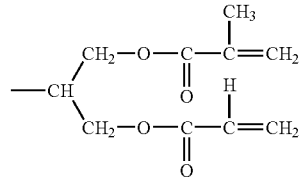

Resin precursor B: resin precursor obtained by further adding a hindered amine type stabilizer of TINUVIN 292 (70-80% bis(1,2,2,6,6-pentamethyl-4-piperidyl)sebacate and 20-30% methyl(1,2,2,6,6-pentamethyl-4-piperidyl)sebacate) 2 wt % in the resin precursor A.

Resin precursor C: resin precursor prepared in the same manner as the resin precursor A, except that SEESORB 709 was not added.

Resin precursor a: resin precursor prepared in the same manner as the resin precursor C, except that a photopolymerization initiator of IRGACURE 184 (1-hydroxycychlohexyl phenyl ketone) was added 2 wt % instead of IRGACURE 819.

The molar absorption coefficient at 405 nm of IRGACURE 819 was $8.99 \times 10^2$. IRGACURE 184 showed no absorption and thus the molar absorption coefficient was unmeasurable.

(Measurement of Internal Transmittances and Light Resistance Test of Resin Layers)

The tests described below were carried out in order to evaluate transmittances for light of various wavelengths and the light resistance of the resin layers obtained by curing the respective resin precursors described above.

Specifically, samples were produced by molding the resin layer on BK7 with 3 mm thick, using the foregoing resin precursors, so as to have the resin thicknesses of 0.1 mm and 0.2 mm (these samples will be referred to as planar samples). On this occasion, the resin precursors were cured by applying the ultraviolet light in the irradiation of 10000 mJ/cm$^2$ (which was measured with a 405-nm light detector). Spectral transmittance measurement was carried out with each of the planar samples with the resin thicknesses of 0.1 mm and 0.2 mm, and from the results obtained, the internal transmittances of each resin layer were calculated for light of the wavelengths of 360 nm and 400 nm in the thickness of 100 μm.

The 160-hours light resistance test with a carbon fadometer (UV carbon arc lamp, black panel temperature 63° C., 50% RH) was carried out using each of the planar samples with the resin thickness of 0.2 mm. The light was applied from the surface on the resin layer side.

TABLE 1

|  |  | A | B | a |
|---|---|---|---|---|
| 100 μm-thick internal transmittances transmittances (%) of planar sample at 420 nm in resin thickness of 0.2 mm | 360 nm | 0 | 0 | 97 |
|  | 400 nm | 89 | 89 | 97 |
|  | before test | 90 | 90 | 85 |
|  | after test | 90 | 88 | 75 |

As shown in Table 1, it was found that a cured product of the resin precursor A (referred to hereinafter as "resin A") and a cured product of the resin precursor B (referred to hereinafter as "resin B") had the absorption capability of the ultraviolet light whereas a cured product of the resin precursor a (referred to hereinafter as "resin a") transmitted most of the ultraviolet light.

The resin a showed yellowing clearly recognized by eye, after the carbon fadometer test. The spectral transmittance of the sample was measured and the transmittance was found to largely drop at 420 nm in the visible light region (10% decrease).

A cured product of the resin precursor C (referred to hereinafter as "resin C") showed the same result as the resin a in the carbon fadometer test carried out in the same manner as above. Then, a planar sample was prepared by forming the resin layer of the resin C in the thickness of 10 mm on E-BAF8 and the carbon fadometer test was carried out with the planar sample. During the test the light was applied from the E-BAF8 side. As a result, it showed no yellowing as in the case of the resin A and the resin B. It is conceivably because the base material of E-BAF8 absorbed the ultraviolet light. A planar sample was attempted to be prepared using the resin a in the same manner as in the above case, but the resin precursor was not completely cured with the same UV irradiation, resulting in failure in obtaining the resin layer. It is conceivably because the base material absorbed light of the absorption wavelengths of IRGACURE 184.

<Coat Layer>

Each of types described below was formed as the coat layer. The coat layer was provided on the surface of the base material opposite to the surface where the resin layer was formed, and the coat layer was an antireflection coating. A step of such coating was carried out prior to a silane coupling treatment of the base material described below. Each coat was a nine-layered coat consisting of an inorganic oxide.

Coat A: coat whose surface had the reflectance of not more than 1% at 400 nm-700 nm and the reflectance of not less than 2% at 360 nm. The substrate heating temperature during the coating step was 100° C.

Coat a: coat having the same properties as the coat A, but being formed without heating of the substrate.

<Mold>

A stainless steel mold material was plated with nickel and the plated layer was shaped in an aspherical shape.

1-2. Production of Elements

The resin composite-type optical elements (aspherical optical elements) with the ultraviolet cut property were produced according to the following procedure, using the above-described materials and mold (cf. FIG. 1).

First, the base material 10 with the outside diameter (diameter) of 40 mm and the center thickness of 10 mm was prepared (FIG. 1 (A)). This base material 10 used was one the two surfaces of which were preliminarily subjected to the silane coupling treatment, in order to enhance the adhesion to the resin. Each aforementioned resin precursor was dropped onto the resin layer molding surface (concave surface) of this base material 10, then the base material 10 was turned upside down and pushed against a convex surface of the aspherical mold 30 to spread the resin precursor into a desired shape, and thereafter the ultraviolet light was applied in the irradiation of 10,000 mJ/cm$^2$ (measured with the 405-nm light detector) with a high-pressure mercury lamp from the base material 10 side (FIG. 1 (B)) to cure the resin precursor, thereby forming the resin layer 20. The center thickness of the resin layer 20 was 100 μm.

Next, the peripheral part of the base material 10 was pushed with ejectors to release the resin layer 20 from the mold 30, thereby obtaining the aspherical optical element (aspherical lens). The resin layer 20 in the aspherical lens obtained in the present example had the significantly aspherical shape with the maximum thickness of 850 μm and the minimum thickness of 100 μm.

The high-pressure mercury lamp used for the curing was a general one. The high-pressure mercury lamp emitted light of a plurality of wavelengths, and also emitted the light of the wavelength of 405 nm. In some of examples, a filter not transmitting the light of wavelengths of less than 400 nm was inserted in the optical path. The presence or absence of the filter is indicated by the description of "present" or "absent" in the column of "filter" in Table 2 below.

With each of the aspherical optical elements obtained, the transmittance of light of 365 nm was measured at the central part of each element. The results obtained are provided in Table 2.

TABLE 2

|  | Base material | Resin | Coat opposite resin molding surface | Filter | Transmittance at 365 nm at center of element |
|---|---|---|---|---|---|
| Example 1 | A | A | absent | absent | 0 |
| Example 2 | A | A | absent | present | 0 |
| Example 3 | A | A | A | absent | 0 |

TABLE 2-continued

| | Base material | Resin | Coat opposite resin molding surface | Filter | Transmittance at 365 nm at center of element | |
|---|---|---|---|---|---|---|
| Example 4 | A | B | absent | absent | 0 | |
| Example 5 | B | A | absent | absent | 0 | |
| Example 6 | a | A | absent | absent | 0 | |
| Reference Example 1 | A | C | absent | absent | 40 | |
| Comparative Example 1 | a | a | absent | absent | 80 | |
| Comparative Example 2 | A | a | absent | absent | — | not completely cured |
| Comparative Example 3 | a | a | absent | present | — | not cured |
| Example 7 | A | A | a | absent | 0 | coat peeled off |

As shown in Table 2, the ultraviolet absorption capability was confirmed with Examples 1 to 7. Reference Example 1 also showed absorption of ultraviolet light by the base material, but failed to achieve the ultraviolet absorption capability comparable to that in Examples 1 to 7. Example 7 showed the high ultraviolet absorption capability, but the coat a peeled off in a grid peeling test because the substrate was not heated during formation of the coat layer. The coat A in Example 3 did not peel off.

On the other hand, the element of Comparative Example 1 transmitted a considerable amount of ultraviolet light. In Comparative Example 2, the resin was not completely cured by the same UV irradiation. The reason for it is that the base material A did not transmit a sufficient quantity of ultraviolet light necessary for curing of the resin a. In Comparative Example 3 the resin precursor was not cured, either. This is because the filter was inserted. It is thus necessary to use the resin precursor that cures at a wavelength not absorbed by the base material and the filter or the like.

2. Production of Both-Side Aspherical Optical Elements (cf. FIG. 2)

2-1. Materials

The base material, resin, and mold were the same as those described above.

2-2. Production of Elements

Using these materials and mold, the resin composite-type optical elements were produced according to the procedure described below (cf. FIG. 2).

First, the base material 10 with the outside diameter (diameter) of 40 mm and the center thickness of 10 mm was prepared. The base material 10 used was one the two surfaces of which were preliminarily subjected to the silane coupling treatment, in order to enhance the adhesion to the resin. Each aforementioned resin precursor was dropped onto the resin layer molding surface (concave surface) of the base material 10, the base material 10 was turned upside down and pushed against the convex surface of the aspherical mold to spread the resin precursor into a desired shape, and the ultraviolet light was applied in the irradiation of 10,000 mJ/cm$^2$ (measured with the 405-nm light detector) with the high-pressure mercury lamp from the base material side to cure the resin precursor, thereby forming the resin layer 20 (FIG. 2 (B)). The center thickness of the resin layer was 100 μm.

Next, the peripheral part of the base material 10 was pushed with ejectors to release the resin layer 20 from the mold, thereby obtaining the aspherical lens (FIG. 2 (C)). The resin layer 20 had the aspherical shape with the maximum thickness of 400 μm and the minimum thickness of 100 μm.

Furthermore, using the same mold, the resin layer 21 was also molded in the same manner on the convex surface of the base material 10 (FIG. 2 (D)-(E)). The resin layer 21 formed herein was a layer cured with light transmitted by the resin layer 20 molded in the foregoing step and the base material 10. The both-side aspherical optical elements 2 with the resin layers 20 (front) and 21 (back) of aspherical shape on both sides were produced as described above.

With each of the both-side aspherical optical elements obtained, the transmittance of light of 365 nm was measured at the central part of each element. The results obtained are provided in Table 3.

TABLE 3

| | Base material | Resin front | Resin back | Transmittance at 365 nm at center of element | |
|---|---|---|---|---|---|
| Example 8 | a | A | A | 0 | |
| Reference Example 2 | A | C | C | 40 | |
| Comparative Example 4 | a | a | a | 60 | |
| Reference Example 3 | a | A | a | 0 | not cured on back |

As shown in Table 3, the ultraviolet absorption capability was confirmed with Example 8. Reference Example 2 showed absorption of ultraviolet light by the base material, but failed to achieve the ultraviolet absorption capability comparable to that in Example 8. The element of Comparative Example 4 transmitted a considerable amount of ultraviolet light. In Reference Example 3, the resin precursor on the back was not cured. The reason is that the resin A did not transmit the ultraviolet light necessary for curing of the resin a.

It was thus found that it was necessary to use the resin that cured at a wavelength not absorbed by the base material and the resin molded before it.

3. Production of Contact Multilayer Diffractive Optical Elements 3-1. Materials

<Base Material>

The base material was the same as that described above.

<Resin Precursors>

(Precursor of Low Index, High Dispersion Resin)

Resin precursor LA: resin precursor obtained by mixing 52% of 2,2,3,3,4,4,5,5-octafluorohexane-1,6-diacrylate, 43% of 9,9-bis[4-(2-acryloyloxyethoxy)phenyl]fluorene, and 5% of methoxy polypropylene glycol acrylate (n=3) and further adding an ultraviolet absorber of SEESORB 709 2 wt % and a photopolymerization initiator of IRGACURE 819 0.2 wt %.

Resin precursor La: resin precursor prepared in the same manner as the resin precursor LA, except that SEESORB 709 was not added.

Resin precursor Lb: resin precursor prepared in the same manner as the resin precursor LA, except that a photopolymerization initiator of IRGACURE 184 was added 2 wt %, instead of IRGACURE 819.

(Measurement of Internal Transmittances and Light Resistance Test of Resin Layers)

The tests as described below were carried out in order to evaluate the transmittances for light of various wavelengths, and the light resistance of the resin layers obtained by curing each of the above-described resin precursors.

Specifically, samples were produced by molding the resin in the resin thicknesses of 0.1 mm and 0.2 mm on BK7 with 3 mm thick (which will be referred to hereinafter as planar samples). On this occasion, the ultraviolet light was applied in the irradiation of 20000 mJ/cm$^2$ (measured with the 405-nm light detector) to cure the resin precursor. The spectral transmittance measurement was carried out with each of the planar samples with the resin thicknesses of 0.1 mm and 0.2 mm and from the transmittances measured, the 100-μm-thick internal transmittances of each resin layer were calculated for light of 360 nm and 400 nm.

Furthermore, the light resistance test of 160 hours with the carbon fadometer (the same as in the case of "1-1" above) was carried out using each of the planar samples with the resin thickness of 0.2 mm. The light was applied from the surface on the resin layer side.

TABLE 4

|  |  | LA | La |
|---|---|---|---|
| 100 μm-thick internal transmittances | 360 nm | 0 | 43 |
|  | 400 nm | 89 | 85 |
| transmittances (%) of planar sample at 420 nm in resin thickness of 0.2 mm | before test | 90 | 85 |
|  | after test | 90 | 70 |

The resin La (cured product of the resin precursor La) showed yellowing by visual observation after the test.

(Precursor of High Index, Low Dispersion Resin)

Resin precursor HB: resin precursor prepared as follows. An acrylate-terminal oligomer was prepared by mixing tricyclo[5.2.1.0$^{2.6}$]decanedimethanol diacrylate and di(2-mercaptodiethyl)sulfide at the molar ratio of 2.5:1 and adding triethylamine as a catalyst 0.1 wt % to bring about the Michael addition reaction. The absorbent Tomita AD700NS (available from Tomita Pharmaceutical Co., Ltd.) was added and stirred in order to remove the catalyst and the absorber was removed by filtering. The photopolymerization initiator of IRGACURE 819 was added 0.2 wt % in the resultant.

Resin precursor Hb: resin precursor prepared in the same manner as the resin precursor HB, except that the photopolymerization initiator of IRGACURE 184 was added 2 wt %, instead of IRGACURE 819.

<Molds>

A stainless steel mold material was plated with nickel and the plated layer was shaped to form an aspherical surface. The mold for the first layer was a diffraction grating with the grating height of 20 μm. The grating pitch thereof was 3.5 mm near the center and 0.17 mm near the periphery, and the pitch decreased with decrease in distance to the periphery (circumference). The mold for the second layer was a molding surface in the shape of a continuous surface without a diffraction grating.

3-2. Production of Elements

Using the above-described materials and molds, the contact multilayer diffractive optical elements with two layers of resin laid on one side of the base material were produced according to the procedure described below (cf. FIG. 3).

First, the base material 10 with the outside diameter (diameter) of 40 mm and the center thickness of 10 mm was prepared (FIG. 3 (A)). The base material 10 used was one the one surface of which were preliminarily subjected to the silane coupling treatment, in order to enhance the adhesion to the resin. The aforementioned resin precursor LA or resin precursor La being the precursor of the low index, high dispersion resin was dropped onto the resin layer molding surface (concave surface) of the base material 10, the base material was turned upside down and pushed against the convex surface of the diffractive grating mold 30 to spread the resin precursor into a desired shape, and thereafter the ultraviolet light was applied in the irradiation of 20000 mJ/cm$^2$ (measured with the 405-nm light detector) with the high-pressure mercury lamp from the base material side to cure the precursor, thereby forming the resin layer 20 (first layer) (FIG. 3 (B)). The center thickness of the resin layer 20 was 100 μm. The mold 30 was released from this resin layer 20 (FIG. 3 (C)).

Next, the mold 32 of the continuous surface was opposed to the resin layer 20, the resin precursor HB or resin precursor Hb being the precursor of the high index, low dispersion resin was filled between them, the ultraviolet light was applied thereto to cure the precursor to form the resin layer 22 (second layer), and thereafter the mold 32 was released (FIG. 3 (D) to (E)). The center thickness of the resin layer 22 was 100 μm.

The high-pressure mercury lamp used was a general one. The high-pressure mercury lamp emitted light of a plurality of wavelengths and also emitted the light of the wavelength of 405 nm.

With each of the contact multilayer diffractive optical elements obtained, the transmittance of light of 365 nm was measured at the central part of each element. The results obtained are provided in Table 5.

TABLE 5

|  |  | Resin | | Transmittance at 365 nm |  |
|---|---|---|---|---|---|
|  | Base material | first layer | second layer | at center of element |  |
| Example 9 | a | LA | HB | 0 |  |
| Example 10 | A | LA | HB | 0 |  |
| Comparative Example 5 | a | La | Hb | 80 |  |
| Reference Example 4 | a | LA | Hb | — | second layer not cured |
| Comparative Example 6 | A | Lb | — | — | not cured |

As shown in Table 5, the ultraviolet absorption capability was confirmed with Examples 9 and 10.

On the other hand, the element of Comparative Example 5 transmitted a considerable amount of ultraviolet light. In Reference Example 4 and Comparative Example 6, the resin precursor was not cured. The reason is that the base material A and the resin LA did not transmit the ultraviolet light necessary for curing of the resin precursor Lb or Hb. It is thus seen that it is necessary to use the resin that cures at a wavelength not absorbed by the base material and the resin molded before it.

4. Production of Contact Multilayer Diffractive Optical Elements (Glass/Resin) (cf. FIG. 4)

4-1. Materials

<Base Material>

Base material A': K-PSK60 (available from Sumita Optical Glass, Inc.), a glass (preform) not absorbing ultraviolet light.

<Resin Precursor>

The resin precursors used were the same as the aforementioned resin precursors A, B, and C.

<Molds>

Mold for molding glass: mold obtained by plating metal of stainless steel with a NiP plating material consisting primarily of nickel and phosphorus. A molding surface of an upper die of this mold had a shape to transfer a diffraction grating surface of a concentric circular shape with the grating height of 15 μm and the grating pitch decreasing from the center toward the periphery (the grating pitch of 2 mm near the center and the grating pitch of 0.12 mm near the periphery), onto a preform surface. A molding surface of a lower die had a spherical shape which was concave toward the upper die.

Mold for molding the resin layer: mold obtained by plating STAVAX (registered trademark) with nickel and shaping the plated layer. The mold had a molding surface in a shape of a continuous surface without a diffraction grating.

4-2. Production of Elements

Figure 4:
FIG. 4(A)-4(E) is a drawing showing production steps of a contact multilayer diffractive optical element (glass/resin) according to an example.
Figure 4:
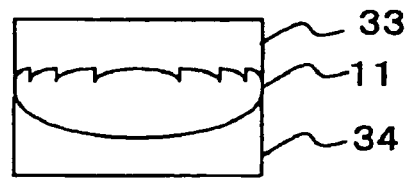
Figure 4:
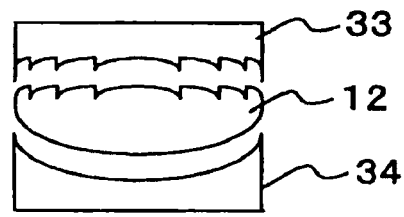
Figure 4:
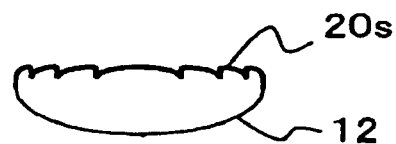
Figure 4:
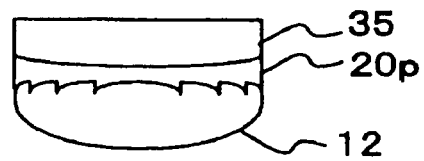
Figure 4:
Figure 4:
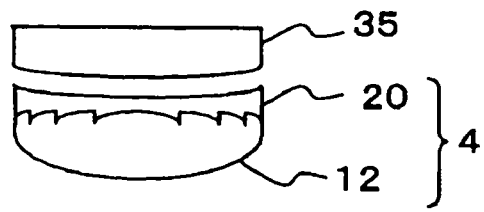

As shown in FIG. 4 (A), the outside diameter of the preform 11 of the optical glass was 60 mm, the upper surface was polished in an approximately planar shape, and the lower surface was polished in an approximately spherical shape convex on the lower die side. First, this preform 11 was set between the dies 33, 34, and an inert gas (nitrogen) was supplied into a molding chamber to make an inert atmosphere. It is also possible to supply argon gas, instead of nitrogen, as the inert gas. The preform 11 and dies 33, 34 were heated with an infrared lamp to increase the temperature to 420° C., and this temperature was retained for five minutes. The lower die was driven by an unrepresented driving mechanism to shape the preform under the pressure of 50 kg/cm² for five minutes (FIG. 4 (B)). While keeping the pressure, the temperature was gradually decreased to 370° C. in five minutes. Then the lower die was driven by the unrepresented driving mechanism to open the dies 33, 34. At this time, the preform 11 with the molded surface transferred, i.e., the molded lens 12 remained on the lower die. Then the molded lens 12 and the dies 33, 34 were cooled in a nitrogen atmosphere. The temperature was decreased to ordinary temperature (70° C.) and thereafter the molded lens 12 was taken out of the lower die (FIG. 4 (C)).

Next, the molded surface 20s of the diffraction grating was subjected to the silane coupling treatment to enhance adhesion to the resin. The aforementioned resin precursor 20p was dropped onto it, the molded lens (base material) 12 was turned upside down and pushed against the convex surface of the spherical mold 35 to spread the resin precursor 20p into a desired shape, and the ultraviolet light was applied in the irradiation of 10,000 mJ/cm² (measured with the 405-nm light detector) with the high-pressure mercury lamp from the base material 12 side to cure the precursor, thereby forming the resin layer 20 (FIG. 4 (D)). The center thickness of the resin layer 20 was 100 μm. Next, the peripheral part of the base material 12 was pushed with ejectors to release the resin layer 20 from the mold 35, thereby obtaining the diffractive optical element 4 (FIG. 4 (E)).

The high-pressure mercury lamp used herein was a general one. The high-pressure mercury lamp emitted a plurality of wavelengths and also emitted the light of the wavelength of 405 nm.

With each of the contact multilayer diffractive optical elements obtained, the transmittance of light of 365 nm was measured at the central part of each element. The results obtained are provided in Table 6.

TABLE 6

|  | Base material | Resin | Transmittance at 365 nm at center of element |
|---|---|---|---|
| Example 11 | A' | A | 0 |
| Example 12 | A' | B | 0 |
| Comparative Example 7 | A' | C | 80 |

The ultraviolet absorption capability was confirmed with Examples 11 and 12. On the other hand, the element of Comparative Example 7 transmitted a considerable amount of ultraviolet light.

5. Production of Contact Multilayer Diffractive Optical Elements 5-1. Materials

<Base Material>

The base material used was the aforementioned base material a: E-BK7 (available from HIKARI GLASS CO., LTD.), a glass not absorbing ultraviolet light.

<Resin Precursors>

(Precursor of Low Index, High Dispersion Resin)

Resin precursor LB: resin precursor obtained by mixing 52% of 2,2,3,3,4,4,5,5-octafluorohexane-1,6-diacrylate, 43% of 9,9-bis[4-(2-acryloyloxyethoxy)phenyl]fluorene, and 5% of methoxy polypropylene glycol acrylate (n=3), and further adding the ultraviolet absorber of SEESORB 709 2 wt % and the photopolymerization initiators of IRGACURE 819 0.2 wt % and IRGACURE 184 2.0 wt %.

Resin precursor LC: resin precursor prepared in the same manner as the resin precursor LB, except that TINUVIN405 was used instead of SEESORB 709 as the ultraviolet absorber.

Resin precursor LD: resin precursor prepared in the same manner as the resin precursor LB, except that TINUVIN292 was further added 2% as a hindered amine type light stabilizer (HALS).

Resin precursor Lc: resin precursor prepared in the same manner as the resin precursor LB, except that UNINUL3039 was used instead of SEESORB 709 as the ultraviolet absorber.

Resin precursor Ld: resin precursor prepared in the same manner as the resin precursor LB, except that no ultraviolet absorber was added.

Resin precursor Le: resin precursor obtained by mixing a compound (molecular weight 800) represented by Chemical Formula (3) below and a compound represented by Chemical Formula (4) below, at the ratio of 42:58 (former: latter, weight ratio) and adding photopolymerization initiators of IRGACURE 184 2.0 wt % and IRGACURE 819 0.2 wt %.

[Chem 14]

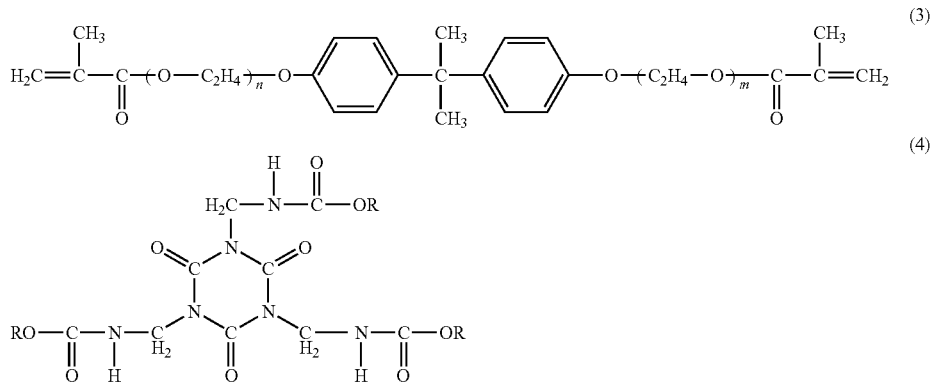

(Measurement of Internal Transmittances and Light Resistance Test of Resin Layers)

The transmittances for light of various wavelengths and the light resistance of the resin layers obtained by curing each of the above resin precursors were evaluated as follows. The results obtained are provided in Table 7.

First, planar samples were prepared in the same manner as in the case of "1-1," using each of the above-described resin precursors. Cured products of the resin precursors LB, LC, LD, Lc, Ld, and Le formed thereby will be referred to as resins LB, LC, LD, Lc, Ld, and Le, respectively. The spectral transmittance measurement was carried out with each of the planar samples with the resin thicknesses of 0.1 mm and 0.2 mm thus formed, and the 100-μm-thick internal transmittances of the respective resin layers for light of 360 nm and 400 nm were calculated from the transmittances measured.

Figure 5:
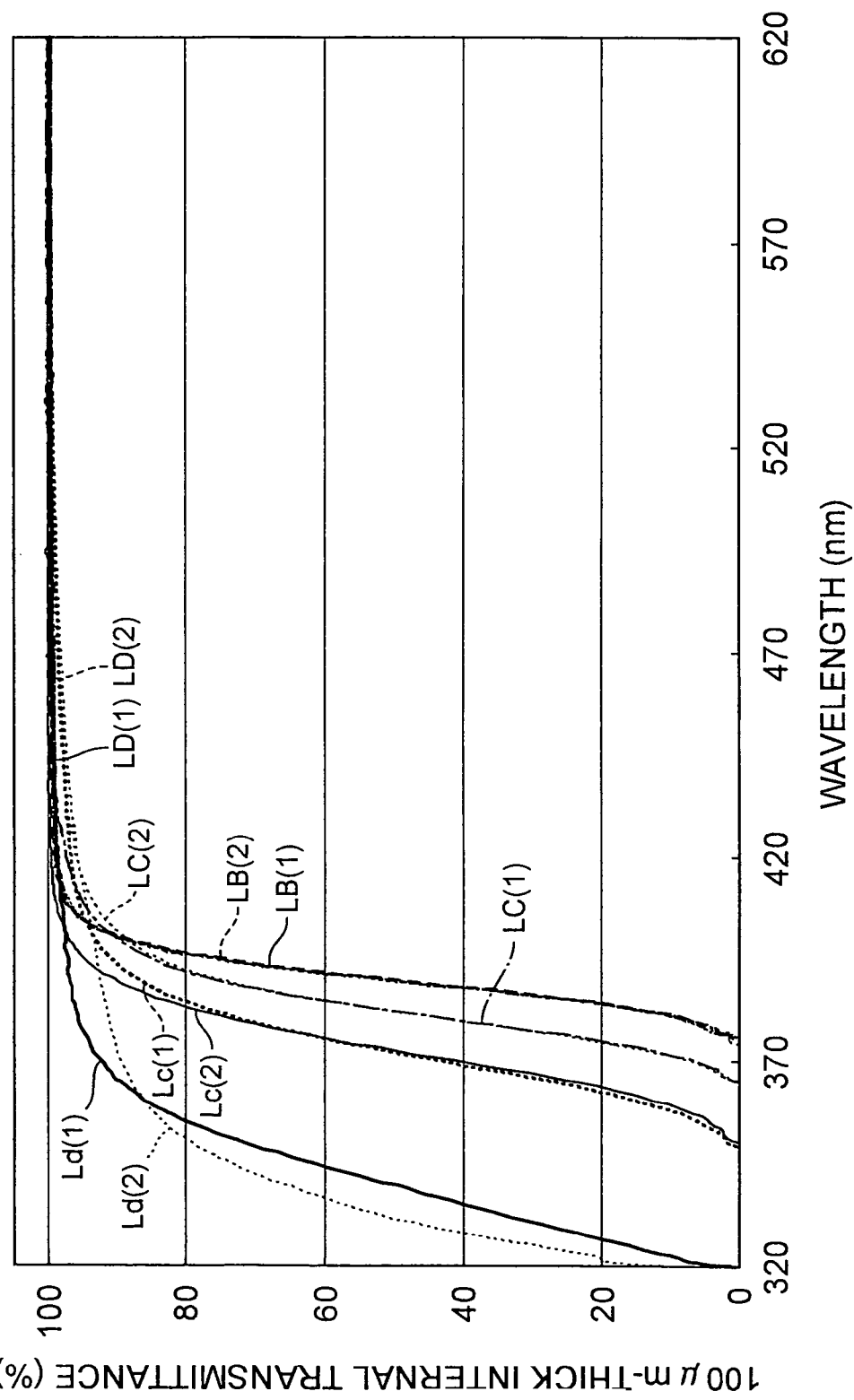
FIG. 5 is a graph of 100-μm-thick internal transmittances against wavelengths obtained before and after a carbon fadometer test, with each of samples using resins LB, LC, LD, Lc, and Ld.

The light resistance test of 160 hours with the carbon fadometer (the same as in "1-1") was carried out using each planar sample with the resin thickness of 0.2 mm to check whether there was yellowing in the resin layer of each sample by visual inspection. In Table 7 below, ○ represents a sample without yellowing and x a sample with yellowing. Furthermore, FIG. 5 shows the results of the spectral transmittance measurement before and after the light resistance test, for each of the samples using the resins LB, LC, LD, Lc, and Ld. In FIG. 5, LB(1), LC(1), LD(1), Lc(1), and Ld(1) indicate the results before the light resistance test and LB(2), LC(2), LD(2), Lc(2), and Ld(2) the results after the light resistance test.

TABLE 7

|  |  | LB | LC | LD | Lc | Ld | Le |
|---|---|---|---|---|---|---|---|
| 100 μm-thick internal transmittances | 360 nm | 0 | 0 | 0 | 11.2 | 85.7 | 96.6 |
|  | 400 nm | 88.2 | 90.0 | 89.1 | 97.1 | 97.5 | 99.1 |
| yellowing before and after carbon fadometer test |  | ○ | X | ○ | X | X | ○ |

As shown in Table 7, the resins LB, LC, and LD all had the ultraviolet absorption capability. However, the resin LC showed yellowing after the 160-hour light resistance test with the carbon fadometer and was found to be a little inferior in light resistance.

On the other hand, it was confirmed that the resin Lc was inferior in ultraviolet absorption capability to the resins LB, LC, and LD and that the light resistance thereof was also insufficient. The resin Ld did not have the ultraviolet absorption capability, either, and the light resistance thereof was also inferior. Furthermore, it was found that the resin Le had the light resistance but did not have the ultraviolet absorption capability.

Figure 6:
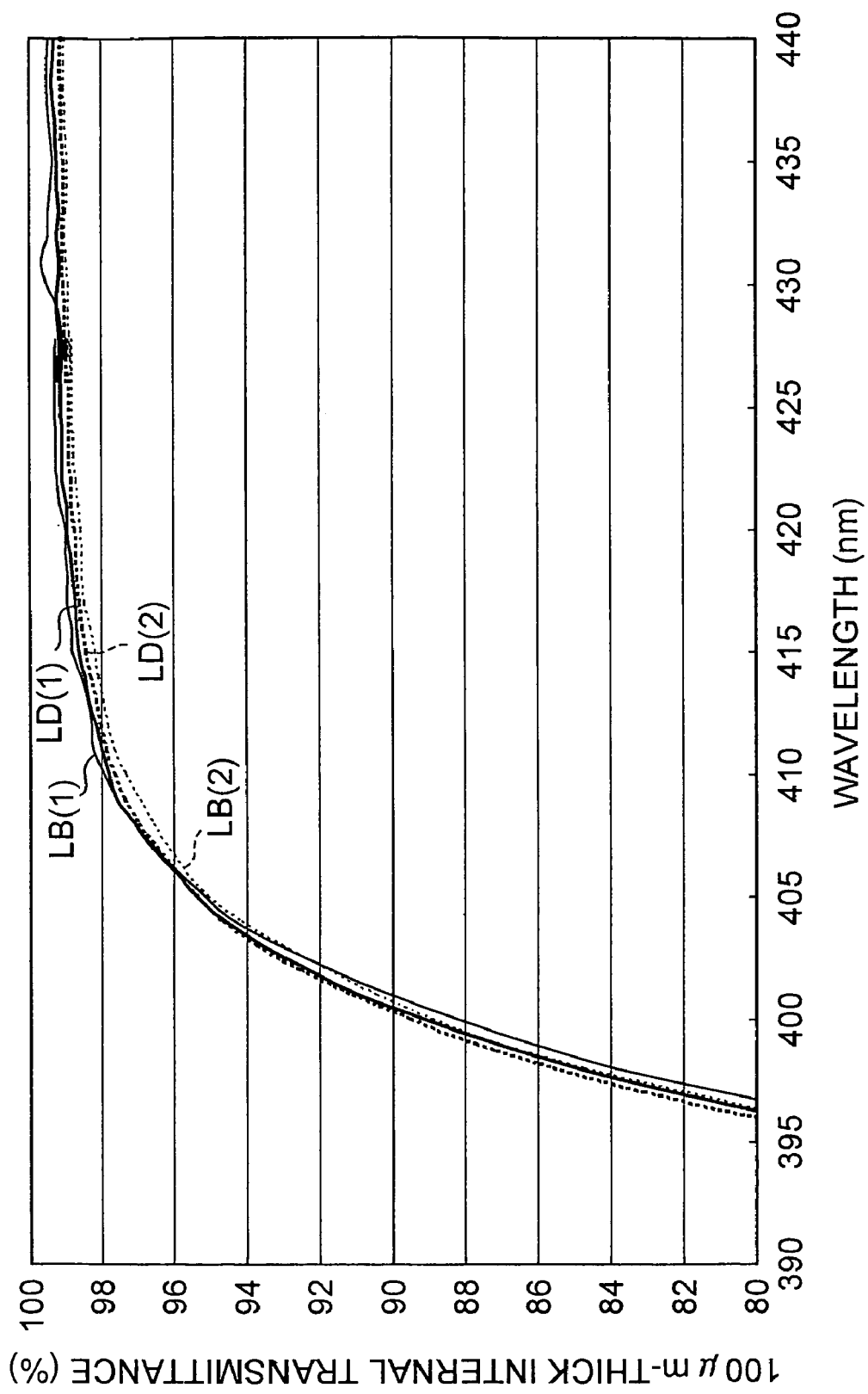
FIG. 6 is a graph of 100-μm-thick internal transmittances against wavelengths obtained before and after a carbon fadometer test, with each of planar samples using resins LB and LD.

Furthermore, for comparison of light resistance between the resin LB and the resin LD (resin LB+HALS), change in the 100-μm-thick internal transmittance before and after the 160-hour light resistance test with the carbon fadometer was compared for the planar samples with these resins. FIG. 6 is a graph showing the 100-μm-thick internal transmittances obtained before and after the carbon fadometer test, for each of the planar samples using the resins LB and LD. In FIG. 6, LB(1) and LD(1) indicate the results before the carbon fadometer test and LB(2) and LD(2) the results after the test.

As shown in FIG. 6, it was confirmed that the change in 100-μm-thick internal transmittance before and after the light resistance test of 160 hours with the carbon fadometer was smaller in the case of use of the resin LD than in the case of use of the resin LB. This proved that the resin LD further containing HALS was superior in light resistance to the resin LB.

Figure 7:
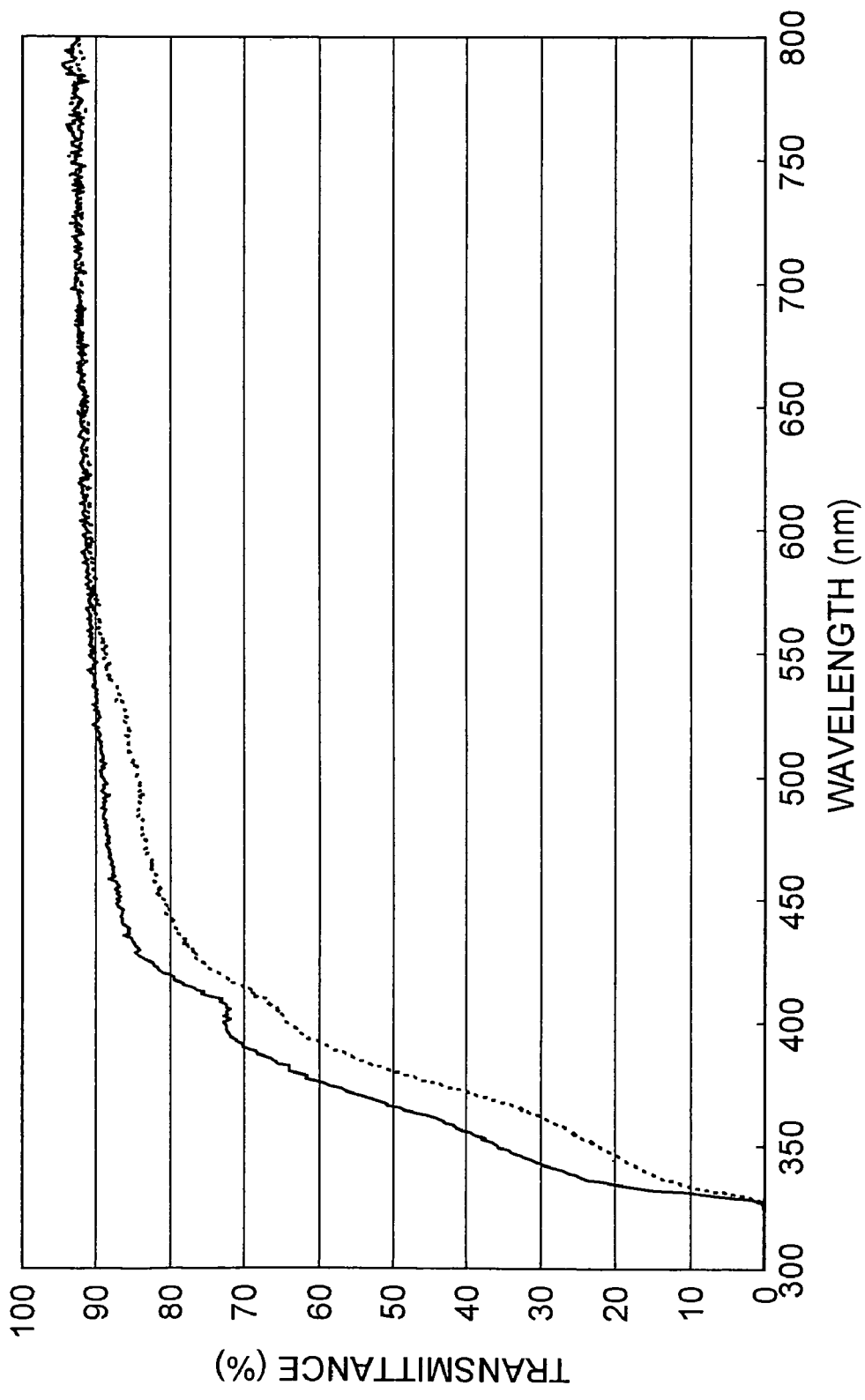
FIG. 7 is a graph of change in 100-μm-thick internal transmittance before and after the irradiation of 480000 mJ/cm$^2$ with a metal halide lamp, of a planar sample obtained using a resin precursor of Reference Example 3.

As Reference Example 5, a resin precursor was prepared in the same manner as the resin precursor LD, except that no ultraviolet absorber was added, and a similar planar sample (resin thickness 0.1 mm) was produced using it. It was subjected to the irradiation of 480000 mJ/cm$^2$ with a metal halide lamp and it was found that the resin after curing was yellowing and that the transmittances before and after the test also showed significant change as shown in FIG. 7. In FIG. 7, a solid line indicates the transmittance before the irradiation and a dashed line the transmittance after the irradiation. This proved that simple addition of HALS did not achieve sufficient improvement in light resistance and that the excellent light resistance of the resin layer was achieved by the combination of the ultraviolet absorber and HALS.

(Precursor of High Index, Low Dispersion Resin)

The aforementioned resin precursor HB was used.

5-2. Production of Elements

The contact multilayer diffractive optical elements (Example 13 and Comparative Example 8) with two resin layers laid on one side of the base material each were produced in the same manner as in 3-2, except that the resin precursors LB and Le were used as precursors of the low index, high dispersion resin and the resin precursor HB as a precursor of the high index, low dispersion resin (cf. FIG. 3).

Table 8 shows the results of respective refractive indices of resins LB, Le, and HB obtained by curing the respective resin precursors LB, Le, and HB, which were measured with the refractometer PR-2 available from Carl Zeiss Jena GmbH.

TABLE 8

| Resins | Refractive indices | | | Mean Dispersion (nF − nC) |
|---|---|---|---|---|
|  | nd | nC | nF |  |
| LB | 1.5278 | 1.5233 | 1.5391 | 0.0158 |
| Le | 1.5278 | 1.5244 | 1.5360 | 0.0116 |
| HB | 1.5571 | 1.5538 | 1.5650 | 0.0112 |

The above-described contact multilayer diffraction gratings each were designed to have such a grating height that the first-order diffraction efficiency for the d line was 100%. In this case, diffraction efficiencies for the C line and F line were calculated for each of the contact multilayer diffraction gratings. The results obtained are provided in Table 9.

The grating height d of a contact multilayer diffraction grating designed to have the mth-order diffraction efficiency of 100% at a wavelength $\lambda o$ is given by the following equation where $n_1(\lambda o)$ and $n_2(\lambda o)$ are the respective refractive indices of the two resin layers.

$$\{n_1(\lambda o) - n_2(\lambda o)\} \times d = m \times \lambda o$$

The mth-order diffraction efficiency $\eta_m$ at a wavelength $\lambda$ in this case is given by the following equation.

$$\eta_m = \{\sin(a-m)\pi/(a-m)\pi\}^2$$

In this equation, $a = \{(n_1(\lambda)-1)d - (n_2(\lambda)-1)d\}/\lambda$.

TABLE 9

| | Resins | | Diffraction efficiencies | | |
|---|---|---|---|---|---|
| | First layer | Second layer | d line | C line | F line |
| Example 13 | LB | HB | 100% | 98.4% | 98.6% |
| Comparative Example 8 | Le | HB | 100% | 96.7% | 88.2% |

Table 9 confirmed that the contact multilayer diffractive optical element (Example 13) using the resin LB as the low index, high dispersion resin achieved the high diffraction efficiencies, when compared with the case using the resin Le (Comparative Example 8). When this result was considered together with the results of the internal transmittance measurement and the light resistance test described above, it was found that the resin LB achieved the high diffraction efficiencies, in addition to the excellent ultraviolet absorption capability and light resistance, whereas the resin Le failed to achieve satisfactory ultraviolet absorption capability and diffraction efficiencies though achieving the light resistance.

What is claimed is:

1. A resin composite-type optical element comprising a base material and a resin layer,
   wherein the resin layer comprises at least a first resin layer which is a molded product of a photocurable resin and which has an internal transmittance of not less than 85% for light of the wavelength of 400 nm in the thickness of 100 μm and an internal transmittance of not more than 3% for light of the wavelength of 360 nm in the thickness of 100 μm.

2. The resin composite-type optical element according to claim 1, which has a coat layer on a surface of the base material opposite to the resin layer,
   wherein the surface on the coat layer side has a reflectance of not more than 1% for light of wavelengths from 400 nm to 700 nm and not less than 2% for the light of the wavelength of 360 nm.

3. The resin composite-type optical element according to claim 1, wherein the resin layer comprises a plurality of resin layers, which satisfy at least one of the following conditions:
   a) the layers are formed on one surface of the base material, and
   b) the layers are formed on both surfaces of the base material, and
   wherein at least one of the plurality of resin layers is said first resin layer.

4. The resin composite-type optical element according to claim 1, wherein at least one layer of the first resin layer consists of a cured product of a precursor composition containing:
   a bifunctional fluorinated (meth)acrylate;
   a bifunctional (meth)acrylate with a fluorene structure;
   a photopolymerization initiator; and
   at least one of a benzotriazole type ultraviolet absorber and a dihydroxybenzophenone type ultraviolet absorber, or an ultraviolet absorber having a molar absorption coefficient of not less than 500 at the wavelength of 380 nm.

5. The resin composite-type optical element according to claim 1, wherein a transmittance of said optical element is not more than 50% for the light of the wavelength of 360 nm.

6. The resin composite-type optical element according to claim 1, which is an aspherical optical element or a diffractive optical element.

7. A process for producing a resin composite-type optical element comprising a base material and a resin layer,
   said process comprising:
   forming as said resin layer at least a first resin layer which is a molded product of a photocurable resin and which has an internal transmittance of not less than 85% for light of the wavelength of 400 nm in the thickness of 100 μm and an internal transmittance of not more than 3% for light of the wavelength of 360 nm in the thickness of 100 μm; and
   applying light of a wavelength of not less than 400 nm to a precursor composition of the first resin layer to cure the precursor composition, thereby forming the first resin layer.

8. The process for producing the resin composite-type optical element according to claim 7, wherein the precursor composition contains a photopolymerization initiator having a molar absorption coefficient of not less than 5 for light of the wavelength of 405 nm.

9. The process for producing the resin composite-type optical element according to claim 7, which comprises forming at least one layer of the first resin layer, using a precursor composition containing:
   a bifunctional fluorinated (meth)acrylate;
   a bifunctional (meth)acrylate with a fluorene structure;
   a photopolymerization initiator; and at least one of a benzotriazole type ultraviolet absorber and a dihydroxybenzophenone type ultraviolet absorber, or an ultraviolet absorber having a molar absorption coefficient of not less than 500 at the wavelength of 380 nm.

10. The process for producing the resin composite-type optical element according to claim 7, wherein the precursor composition is one having the internal transmittance of not more than 1% for the light of the wavelength of 360 nm when the thickness is 10 mm.

* * * * *